US012022338B2

(12) United States Patent
Rugeland et al.

(10) Patent No.: US 12,022,338 B2
(45) Date of Patent: Jun. 25, 2024

(54) WIRELESS DEVICE MOBILITY BETWEEN WIRELESS COMMUNICATION NETWORKS

(71) Applicant: Telefonaktiebolaget LM Ericsson (publ), Stockholm (SE)

(72) Inventors: Patrik Rugeland, Stockholm (SE); Icaro L. J. Da Silva, Solna (SE); Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 402 days.

(21) Appl. No.: 17/431,796

(22) PCT Filed: Feb. 27, 2020

(86) PCT No.: PCT/SE2020/050219
§ 371 (c)(1),
(2) Date: Aug. 18, 2021

(87) PCT Pub. No.: WO2020/176032
PCT Pub. Date: Sep. 3, 2020

(65) Prior Publication Data

US 2022/0141731 A1 May 5, 2022

Related U.S. Application Data

(60) Provisional application No. 62/811,355, filed on Feb. 27, 2019.

(51) Int. Cl.
*H04W 36/00* (2009.01)
*H04W 36/32* (2009.01)
*H04W 48/16* (2009.01)
*H04W 76/27* (2018.01)

(52) U.S. Cl.
CPC ....... *H04W 36/0072* (2013.01); *H04W 36/32* (2013.01); *H04W 48/16* (2013.01); *H04W 76/27* (2018.02)

(58) Field of Classification Search
CPC .......................... H04W 36/0072; H04W 88/06
See application file for complete search history.

(56) References Cited

U.S. PATENT DOCUMENTS

2007/0072624 A1* 3/2007 Niemenmaa ............ H04W 8/08 455/456.1
2010/0002637 A1* 1/2010 Huoviala ............ H04W 72/566 370/329
2015/0043340 A1* 2/2015 Wang .................... H04W 48/08 370/328

FOREIGN PATENT DOCUMENTS

EP 2566252 A1 3/2013
WO 2016008538 A1 1/2016
(Continued)

OTHER PUBLICATIONS

International Search Report and Written Opinion dated Nov. 26, 2020 for International Application No. PCT/ SE2020/050219 filed Feb. 27, 2020, consisting of 10-pages.
(Continued)

*Primary Examiner* — Fabricio R Murillo Garcia
(74) *Attorney, Agent, or Firm* — Weisberg I.P. Law, P.A.

(57) ABSTRACT

A wireless device suspends a connection with a first access network and enters an inactive state. While the connection with the first access network is suspended and the wireless device is in the inactive state, the wireless device camps in a specific area of a second wireless communication network that is included in a notification area within which the wireless device is allowed to move without notifying either the second wireless communication network or a first wireless communication network that includes the first access network. Upon camping in the specific area, the wireless device starts a timer. Responsive to expiry of the timer, the wireless device switches from the inactive state to an idle state and/or transmits to the second access network signaling
(Continued)

indicating that the wireless device is in the specific area or that the wireless device requests a connection to the second access network.

25 Claims, 23 Drawing Sheets

(56) References Cited

FOREIGN PATENT DOCUMENTS

| | | | |
|---|---|---|---|
| WO | 2018019362 | A1 | 2/2018 |
| WO | 2018119119 | A1 | 6/2018 |
| WO | 2019004692 | A1 | 1/2019 |

OTHER PUBLICATIONS

3GPP TS 38.331 V15.4.0; 3rd Generation Partnership Project; Technical Specification Group Radio Access Network; NR; Radio Resource Control (RRC) protocol specification (Release 15), Dec. 2018, consisting of 474-pages.

3GPP TS 23.502 V15.4.1; 3rd Generation Partnership Project; Technical Specification Group Services and System Aspects; Procedures for the 5G System; Stage 2 (Release 15), Jan. 2019, consisting of 347-pages.

3GPP TS 38.413 V15.2.0; 3rd Generation Partnership Project; Technical Specification Group Radio Access Network; NG-RAN; NG Application Protocol (NGAP) (Release 15), Dec. 2018, consisting of 308-pages.

3GPP TS 38.423 V15.4.0; 3rd Generation Partnership Project; Technical Specification Group Radio Access Network; NG-RAN; Xn application protocol (XnAP) (Release 15), Jul. 2019, consisting of 309-pages.

3GPP TS 36.423 V15.4.0; 3rd Generation Partnership Project; Technical Specification Group Radio Access Network; Evolved Universal Terrestrial Radio Access Network (E-UTRAN); X2 application protocol (X2AP) (Release 15), Dec. 2018, consisting of 408-pages.

* cited by examiner

WIRELESS DEVICE MOBILITY BETWEEN WIRELESS COMMUNICATION NETWORKS

CROSS-REFERENCE TO RELATED APPLICATIONS

This application is a Submission Under 35 U.S.C. § 371 for U.S. National Stage Patent Application of International Application No.: PCT/SE2020/050219, filed Feb. 27, 2020 entitled "WIRELESS DEVICE MOBILITY BETWEEN WIRELESS COMMUNICATION NETWORKS," which claims priority to U.S. Provisional Application No. 62/811, 355, filed Feb. 27, 2019, entitled "FAILURE HANDLING FOR WIRELESS DEVICE MOBILITY," the entireties of both of which are incorporated herein by reference.

TECHNICAL FIELD

The present application relates generally to a wireless communication system and relates more particularly to mobility of a wireless device between wireless communication networks of the system.

BACKGROUND

In legacy wireless communication networks, such as those based on Long Term Evolution (LTE), a wireless device releases a connection, e.g., a radio resource control, RRC, connection, to an access network when the device has not actively used the connection for some time. The connection between the access network and the core network is also released. This frees the resources consumed by the connections for use by other devices. But the device discards the context for the connection with the access network when it outright releases the connection, meaning that the device will have to fully re-negotiate the context in order to later re-connect to the network.

In modern wireless communication networks, such as those based on New Radio (NR), a wireless device may just suspend its connection with the access network during relatively brief periods of inactivity. The device preserves the context for the connection when the connection is merely suspended, so that the connection can be more quickly resumed if needed using the preserved context. And the connection between the access network and the core network remains intact. If inactivity continues for longer than a brief time, the device may only then release its connection with the access network.

The ability to merely suspend a connection in some types of networks but not others complicates procedures for supporting mobility between those networks. This is true especially if the context for the suspended connection with the access network is lost or otherwise becomes unavailable, which would otherwise render the wireless device unreachable while it remains in an inactive state.

SUMMARY

Some embodiments herein support mobility between networks even if the context for a suspended connection with a network is lost or otherwise becomes unavailable. Some embodiments do so by enabling a wireless device to be paged in one network using the paging identifier assigned to the device by the core network of another network. Other embodiments do so by alternatively or additionally configuring a timer at the wireless device that limits the amount of time the wireless device remains in an inactive state with respect to one network while camping in another network.

More particularly, embodiments herein include a method performed by a wireless device configured to operate in first and second access networks. The first and second access networks respectively provide access to first and second core networks of different types. A first wireless communication network comprises the first access network and the first core network, and a second wireless communication network comprises the second access network and the second core network. The method may comprise suspending a connection with the first access network and entering an inactive state. The method may also comprise, while the connection with the first access network is suspended and the wireless device is in the inactive state, camping in a specific area of the second wireless communication network that is included in a notification area within which the wireless device is allowed to move without notifying either of the first and second wireless communication networks. Here, the notification area includes one or more areas of the first wireless communication network and one or more areas of the second wireless communication network. The method may further comprise, upon camping in the specific area of the second wireless communication network, starting a timer. The method may also comprise, responsive to expiry of the timer, switching from the inactive state to an idle state and/or transmitting to the second access network signaling indicating that the wireless device is in the specific area of the second wireless communication network or that the wireless device requests a connection to the second access network.

In some embodiments, the specific area of the second wireless communication network is a cell of the second access network. Alternatively or additionally, the one or more areas of the first wireless communication network include or cover one or more cells of the first access network and/or the one or more areas of the second wireless communication network include or cover one or more cells of the second access network.

In some embodiments, the connection is a radio resource control, RRC, connection, wherein the inactive state is an RRC inactive state, and the idle state is an RRC idle state.

In some embodiments, the first core network is a 5G Core, 5GC, core network and the second core network is an Evolved Packet Core, EPC, core network.

In some embodiments, the first access network is a New Radio, NR, access network, and the second access network is a Long Term Evolution, LTE, access network or an Evolved UMTS Terrestrial Radio Access Network, E-UTRAN. In other embodiments, the first access network and the second access network are each a Long Term Evolution, LTE, access network or an Evolved UMTS Terrestrial Radio Access Network, E-UTRAN.

In some embodiments, the notification area is a radio access network notification area, RNA, and the timer is an RNA update timer.

In some embodiments, the method further comprises, upon camping in the specific area of the second wireless communication network, determining whether or not the specific area of the second wireless communication network is included in the notification area, and deciding whether or not to start the timer depending respectively on whether or not the specific area of the second wireless communication network is included in the notification area according to said determining. In this case, starting the timer is performed responsive to deciding to start the timer.

In some embodiments, the timer is to be stopped responsive to the wireless device camping in an area of the first wireless communication network or responsive to the wireless device entering the idle state.

In some embodiments, the method may further comprise receiving control signaling indicating a value of the timer. In this case, said starting comprises starting the timer with the indicated value.

In some embodiments, the control signaling is included in an RRC Release message.

In some embodiments, the timer is started with a value corresponding to 1 minute or less in time.

In some embodiments, the method further comprises, while camping in the specific area of the second wireless communication network, monitoring a paging channel of the second access network for a paging message directed to the wireless device, using a paging identifier assigned to the wireless device by the first core network. In some embodiments, the paging identifier is a 5G-S-TMSI identifier.

Embodiments herein also include corresponding apparatus, computer programs, and carriers of those computer programs. For example, embodiments herein include a wireless device configured to operate in first and second access networks. The first and second access networks respectively provide access to first and second core networks of different types. A first wireless communication network comprises the first access network and the first core network, and a second wireless communication network comprises the second access network and the second core network. The wireless device may be configured, e.g., via communication circuitry and processing circuitry, as follows. The wireless device may be configured to suspend a connection with the first access network and entering an inactive state. The wireless device may be configured to, while the connection with the first access network is suspended and the wireless device is in the inactive state, camp in a specific area of the second wireless communication network that is included in a notification area within which the wireless device is allowed to move without notifying either of the first and second wireless communication networks. Here, the notification area includes one or more areas of the first wireless communication network and one or more areas of the second wireless communication network. The wireless device may also be configured to, upon camping in the specific area of the second wireless communication network, start a timer. The wireless device may be configured to, responsive to expiry of the timer, switch from the inactive state to an idle state and/or transmit to the second access network signaling indicating that the wireless device is in the specific area of the second wireless communication network or that the wireless device requests a connection to the second access network.

Embodiments herein also include a method performed by a wireless communication system that comprises a first wireless communication network and a second wireless communication network. The first wireless communication network comprises a first access network and a first core network, and the second wireless communication network comprises a second access network and a second core network. The method comprises transmitting, from a network node in the first wireless communication network or the second wireless communication network, control signaling to a wireless device, where the control signaling indicates a value of a timer. The method may also comprise starting, by the wireless device, a timer with the indicated value upon the wireless device, while having a connection suspended with the first access network, camping in a specific area of the second wireless communication network that is included in a notification area. The notification area is an area within which the wireless device is allowed to move without notifying either of the first and second wireless communication networks. The notification area includes one or more areas of the first wireless communication network and one or more areas of the second wireless communication network. The method may also comprise, upon expiry of the timer, switching, by the wireless device, from an inactive state to an idle state and/or transmitting from the wireless device to the second access network signaling indicating that the wireless device is in the specific area of the second wireless communication network or that the wireless device requests a connection to the second access network.

In some embodiments, the specific area of the second wireless communication network is a cell of the second access network, the one or more areas of the first wireless communication network include or cover one or more cells of the first access network and/or the one or more areas of the second wireless communication network include or cover one or more cells of the second access network.

In some embodiments, the connection is a radio resource control, RRC, connection, wherein the inactive state is an RRC inactive state, and wherein the idle state is an RRC idle state.

In some embodiments, the first core network is a 5G Core, 5GC, core network and the second core network is an Evolved Packet Core, EPC, core network.

In some embodiments, the first access network is a New Radio, NR, access network, and the second access network is a Long Term Evolution, LTE, access network or an Evolved UMTS Terrestrial Radio Access Network, E-UTRAN. In other embodiments, the first access network and the second access network are each a Long Term Evolution, LTE, access network or an Evolved UMTS Terrestrial Radio Access Network, E-UTRAN.

In some embodiments, the notification area is a radio access network notification area, RNA, and the timer is an RNA update timer.

In some embodiments, the timer is to be stopped responsive to the wireless device camping in an area of the first wireless communication network or responsive to the wireless device entering the idle state.

In some embodiments, the control signaling is included in an RRC Release message.

In some embodiments, the value indicated by the control signaling corresponds to 1 minute or less in time.

In some embodiments, the network node is configured to operate in the first wireless communication network.

In some embodiments, the method further comprises transmitting, from the network node to a second network node configured for use in the second wireless communication network, control signalling that indicates a paging identifier assigned to the wireless device by the first core network. In some embodiments, the control signalling further indicates one or more areas of the second wireless communication network in which the wireless device is to be paged using the paging identifier.

Embodiments herein further include a wireless communication system. The wireless communication system comprises a first wireless communication network comprising a first access network and a first core network. The wireless communication system also comprises a second wireless communication network comprising a second access network and a second core network. The wireless communication system further comprises a network node configured to operate in the first wireless communication network or the second wireless communication network. The network node is configured to transmit, from the network node to a wireless device, control signaling that indicates a value of a timer. The wireless communication system also comprises the wireless device. The wireless device is configured to start a timer with the indicated value upon the wireless device, while having a connection suspended with the first access network, camping in a specific area of the second wireless communication network that is included in a notification area. The notification area is an area within which the wireless device is allowed to move without notifying either of the first and second wireless communication networks. The notification area includes one or more areas of the first wireless communication network and one or more areas of the second wireless communication network. The wireless device is further configured to, upon expiry of the timer, switch from an inactive state to an idle state and/or transmitting from the wireless device to the second access network signaling indicating that the wireless device is in the specific area of the second wireless communication network or that the wireless device requests a connection to the second access network.

DETAILED DESCRIPTION

Figure 1:
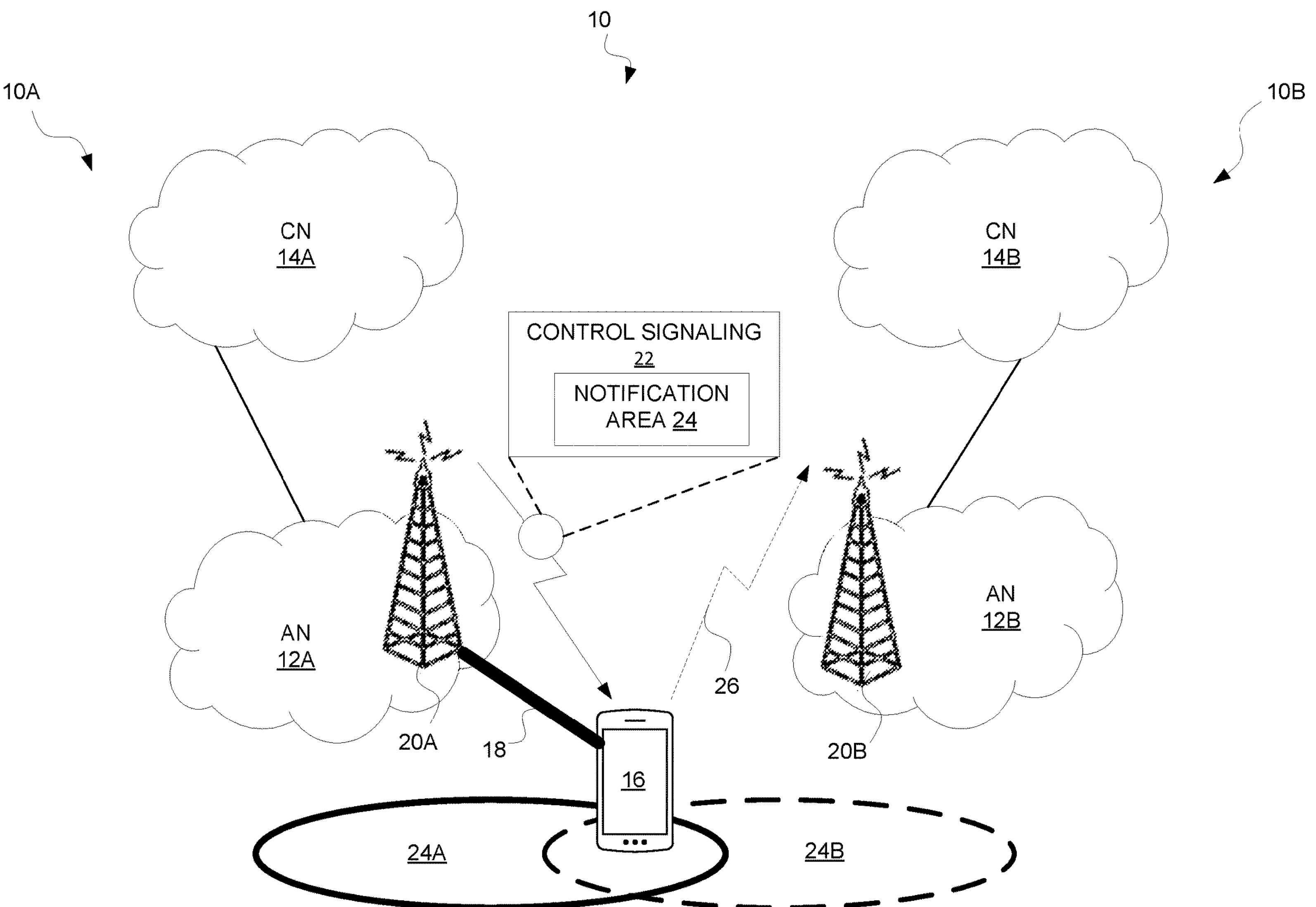
FIG. 1 is a block diagram of a wireless communication system comprising wireless communication networks according to some embodiments.

FIG. 1 shows a wireless communication system 10 that includes a first wireless communication network 10A and a second wireless communication network 10B according to some embodiments. The first wireless communication network 10A comprises a first access network (AN) 12A and a first core network (CN) 14A. The second wireless communication network 10B comprises a second AN 12B and a second CN 14B. The first and second CNs 14A, 14B are different types of CNs. For example, the first CN 14A may be a 5GC network and the second CN 14B may be an Evolved Packet Core (EPC) network. The first and second ANs 12A, 14B may be the same type, e.g., E-UTRAN, or different types, e.g., NR and E-UTRAN.

Regardless, a wireless device 16 is shown in FIG. 1 as having a connection 18, e.g., a radio resource control, RRC, connection, with the first AN 12A. The first wireless communication network 10A supports suspension of this connection 18, e.g., after a period of inactivity. In some embodiments, suspension of the connection 18 means the radio resources for the connection 18 are released but the context for the connection 18 is preserved to reduce re-connection latency. Alternatively or additionally, suspension of the connection 18 means the wireless device 16 operates in an inactive state, e.g., RRC_INACTIVE as described later. Regardless, to effect suspension of the connection 18, a first access node 20A in the first AN 12A transmits control signalling 22 to the wireless device 16 indicating that the connection 18 is to be suspended. The wireless device 16 may correspondingly receive the control signalling 22 and suspend the connection 18 according to the control signalling 22.

The control signalling 22, e.g., in the same or a different control message, may also indicate a so-called notification area 24 (e.g., a RAN notification area, RNA). The notification area 24 is an area within which the wireless device 16 is allowed to move, e.g., while the connection 18 is suspended, without notifying either of the first and second wireless communication networks 10A, 10B. The control signaling 22 in some embodiments indicates the notification area 24 includes one or more areas, e.g., cells or RAN areas, of the first wireless communication network 10A and one or more areas, e.g., cells or RAN areas, of the second wireless communication network 10B. For ease of illustration, FIG. 1 simply shows the notification area as including one area 24A of the first wireless communication network 10A and one area 24B of the second wireless communication network 10B. With the notification area 24 defined in this way, the wireless device 16 may engage in mobility between the networks 10A, 10B without notifying either of the networks 10A, 10B, so long as the wireless device 16 stays within the notification area 24.

For example, while the wireless device's connection 18 with the first AN 12A is suspended according to the control signalling 22, the wireless device 16 may engage in mobility, e.g., cell (re)selection, from the first AN 12A to the second AN 12B. This may involve the wireless device 16 selecting a cell/beam of the second AN 12 or camping on a cell/beam of the second AN 12, based on reference signal measurements of that cell/beam, e.g., irrespective of any physical movement of the wireless device 16. Alternatively or additionally, such mobility may involve the wireless device 16 entering or moving into a cell/beam of the second AN 12.

Regardless, as a result of such mobility, the wireless device 16 may switch from being located, e.g., camped in, an area 24A of the first wireless communication network 10A to being located, e.g., camped in, an area 24B of the second wireless communication network 10B. The wireless device 16 may in this regard limit its registration to a single network 10A, 10B at a time, e.g., as opposed to being dually registered in both networks 10A, 10B at the same time. In any event, after engaging in this mobility, the wireless device 16 may determine whether to transmit signalling 26 to the second AN 12B, e.g., namely, to a second access node 20B serving (a cell of) the area 24B of the second wireless communication network 10B. The signalling 26 may for instance indicate that the wireless device 16 is in that area 24B of the second wireless communication network 10B, e.g., so as to be in the form of a tracking area update or registration update. Or, the signalling 26 may indicate that the wireless device 16 requests a connection to the second AN 12B, e.g., so as to be in the form of a connection request. Regardless, the wireless device 16 may decide whether to transmit this signalling 26 depending at least in part on whether this area 24B of the second wireless communication network 10B in which the wireless device 16 is located is included in the notification area 24. In some embodiments, if the area 24B is included in the notification area 24, the wireless device 16 does not transmit the signalling 26 to the second AN 12B.

Accordingly, mobility of the wireless device 16 within the notification area 24, even if that mobility involves mobility between the wireless communication networks 10A, 10B, will not trigger the device 16 to transmit signalling 26, e.g., in the form of a location update or connection request. And this may be the case even if the source network 10A supports suspended access network connections but the target network 10B lacks such support.

Some embodiments herein concern the scenario where the area 24B is indeed included in the notification area 24.

In this regard, mobility of the wireless device 16 to the second access network 12B may involve or result in the wireless device 16 monitoring a paging channel (not shown) of the second access network 12B for a paging message directed to the wireless device 16. Particularly in cases where the wireless device's mobility is confined within the notification area 24, though, the second access network 12B may be unaware of the device's presence and may not itself know how to page the wireless device 16. According to some embodiments, then, the second access network 12B may receive control signalling, e.g., from the first network 10A, indicating one or more paging identifiers with which to send a paging message to the wireless device 16. Notably, these one or more paging identifiers are assigned by the first wireless communication network 10A, not the second wireless communication network 10B. The paging identifier(s) may have been assigned to the device 16 at the time the connection 18 was suspended. In some embodiments, the paging identifier(s) include a paging identifier, e.g., an inactive radio network temporary identifier, I-RNTI, assigned by the first AN 12A. In other embodiments, the paging identifier(s) include a paging identifier assigned by the first CN 14A. Regardless, the wireless device 16 correspondingly monitors the paging channel of the second AN 12B using the paging identifier(s) assigned to it by the first wireless communication network 10A. If the wireless device 16 indeed receives a paging message, the wireless device 16 in some embodiments may only at that point transmit to the second AN 12B signaling 26 indicating that the wireless device 16 is in the area 24B of the second wireless communication network 10B or that the wireless device 16 requests a connection to the second AN 12B. That is, such signaling 26 may have been delayed until the wireless device 16 was actually paged, rather than being proactively sent upon mobility to the second AN 12B.

Some embodiments herein advantageously support the above paging operations even if the first AN 12A loses the context for the suspended connection 18, e.g., due to a failure in the first AN 12A such as a system reboot, mechanical failure, malicious interference, or the like. Some embodiments do so by enabling the wireless device 16 to be paged in the second network 10B using the paging identifier(s) assigned to the device 16 by the core network 14A of network 10A. Other embodiments do so by alternatively or additionally configuring a timer, e.g., an RNA update timer, at the wireless device 16 that limits the amount of time the wireless device 16 remains in the inactive state with respect to AN 12A while camping in network 10B.

Figure 2:
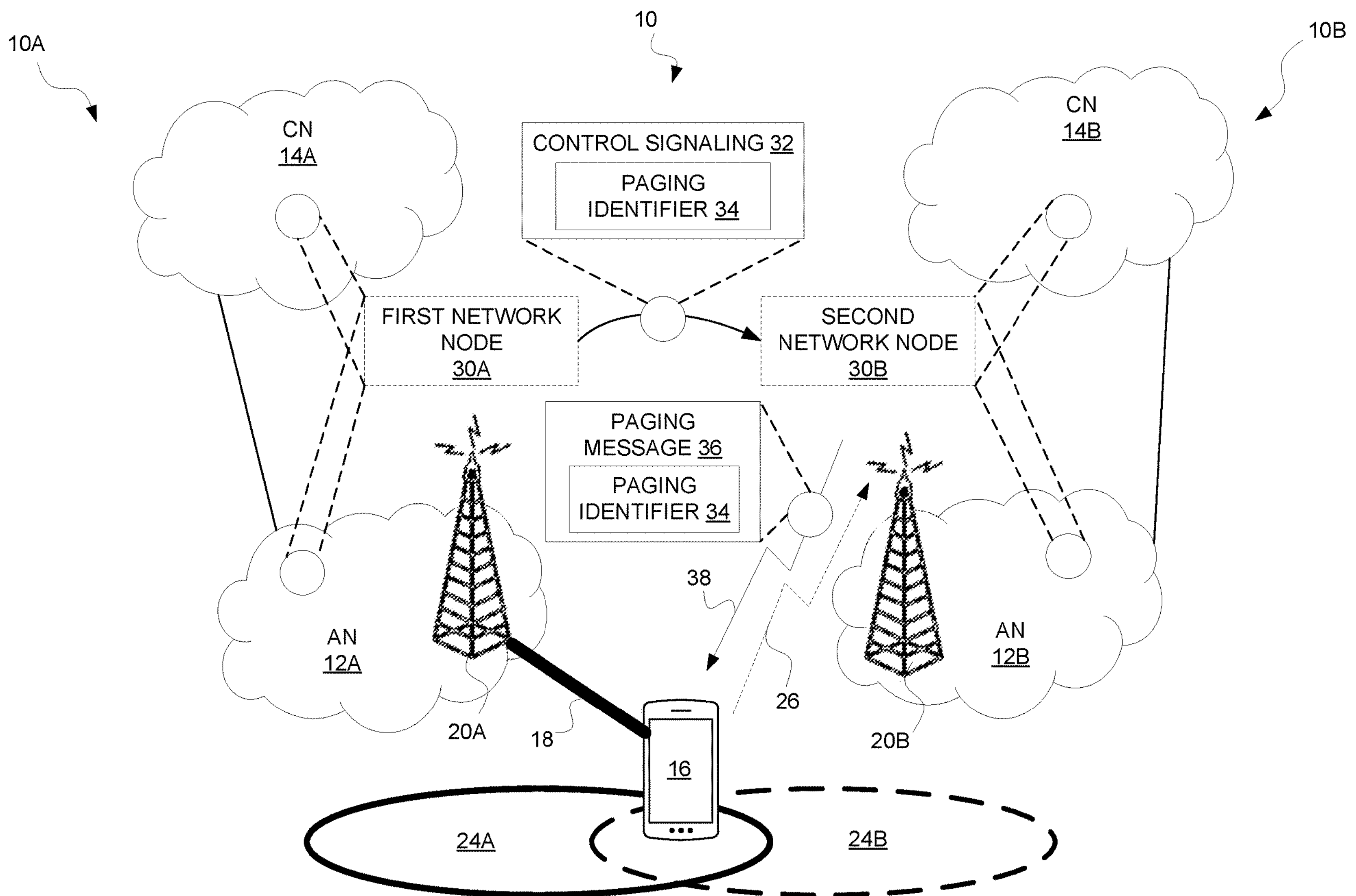
FIG. 2 is a block diagram of a wireless communication system according to some embodiments that page a wireless device using a paging identifier assigned by a core network of a first wireless communication network.

FIG. 2 illustrates some embodiments in this regard for paging the wireless device 16. As shown, a first network node 30A in the first wireless communication network 10A transmits control signaling 32 to a second network node 30B in the second wireless communication network 10B. The first network node 30A may be included in the first AN 12A (e.g., in the form of radio network node 20A) or the first CN 14A, and the second network node 30B may be included in the second AN 12B (e.g., in the form of radio network node 20B) or the second CN 14B. In any case, though, the control signaling 32 indicates a paging identifier 34 assigned to the wireless device 16 by the first CN 14A. The paging identifier 34 may for example be a 5G Serving Temporary Mobile Subscriber Identity (5G-S-TMSI). The control signaling 32 in some embodiments may also indicate one or more areas of the second network 10B in which the wireless device 16 is to be paged. Regardless, equipped with such a paging identifier 34, the second wireless communication network 10B may page the wireless device 16 using the received paging identifier 34. As shown, for example, the second wireless communication network 10B may transmit a paging message 36 on a paging channel 38 of the second AN 12B, and include or otherwise indicate in the paging message 36 the paging identifier 34 assigned by the first CN 14A. In other embodiments not shown, though, the second wireless communication network 10B may derive, from the paging identifier 34, a paging identifier assigned to the wireless device 16 by the second CN 14B or the second AN 12B, and page the wireless device 16 using the derived paging identifier. Either way, the wireless device 16 may correspondingly monitor the paging channel 38 of the second AN 12B for a paging message 36 directed to the wireless device 16, using the paging identifier 34 assigned to the wireless device 16 by the first CN 14A. The wireless device 16 may do so for instance while camping in the area 24B of the second wireless communication network 10B and/or while the connection 18 with the first AN 12A is suspended. This way, even if the first AN 12A loses the context for the suspended connection 18 and thereby becomes unable to page the wireless device 16 using a paging identifier assigned by the first AN 12A, the wireless device 16 can still be paged using the paging identifier 34 assigned by the first CN 14A.

Consider for example some embodiments in which the first network node 30A is included in the first AN 12A and the second network node 30B is included in the second AN 12B. In one such embodiment, the first CN 14A, e.g., an Access and Mobility Function, AMF in the first CN 14A, transmits a paging request to the first network node 30A, e.g., in the form of a gNB. The paging request may include or otherwise indicate the paging identifier 34 assigned to the wireless device 16 by the first CN 14A. Upon reception of this paging request, the first network node 30A may send the control signaling 32, e.g., in the form of a paging request or RAN paging message, to the second network node 30B. The control signaling 32 may for example comprise X2AP signaling. The second network node 30B may then transmit the paging message 36 to the wireless device 16 in accordance with the paging request.

Note, though, that in some embodiments the first network node 30A is a radio network node that has lost the context for the suspended connection 18 and therefore does not itself know to which radio network node(s) in the second AN 12B to send a paging request. In one embodiment, then, the first network node 30A transmits the control signaling 32 to all areas or radio network nodes in the second AN 12B for which the first network node 30A has a neighbour relation, including the second network node 30B. In another embodiment, by contrast, the first CN 14A transmits control signaling to the first network node 30A indicating area(s) in which the wireless device 16 is to be paged and/or in the notification area 24. The control signaling in this case may inform the first network node 30A to which radio network nodes or areas in the second AN 12B the first network node 30A is to send a paging request. The first network node 30A may for example have previously informed the first CN 14A, e.g., via N2 signaling, of which area(s) are included in the notification area 24.

Note also that, in some embodiments, the first network node 30A sends the control signaling 32 for any wireless device in an idle or inactive state. That is, all wireless devices in an idle or inactive state will be paged in not only areas of the first wireless communication network 10A but also in areas of the second wireless communication network 10B. In other embodiments, by contrast, the first network node 30A selectively sends the control signaling 32 only for wireless devices in an inactive state, i.e., that have a suspended connection to the first AN 12A. The first network node 30A may for example report all wireless device state transitions, e.g., RRC state transitions, to the first CN 14A, so that the first CN 14A knows when a wireless device is suspended to the inactive state. In this case, then, if a wireless device is configured with a notification area with area(s) of the first and second networks 10A, 10B and is camping on an area of the second network 10B when the first CN 14A pages the wireless device, the CN 14A may indicate to the first network node 30A that the wireless device was or is in an inactive state with respect to the first network 10A. The first network node 30A may accordingly forward the paging request to neighboring radio network nodes in the second AN 12B for only wireless devices in an inactive state in the first network 10A. This may thereby reduce paging load compared to paging for all wireless devices in an idle or inactive state.

Consider now other embodiments in which the first network node 30A is included in the first CN 14A and the second network node 30B is included in the second CN 14B. In one such embodiment, for example, the first network node 30A may implement an Access and Mobility Function (AMF) and/or the second network node 30B may implement a Mobility Management Entity (MME). Regardless, in these and other embodiments, the control signaling 32 may include the paging identifier 34 and/or indicate the area(s) in the second network 10B in which the wireless device 16 is to be paged. The control signaling 32 may alternatively or additionally indicate a list of area(s) in the notification area 24. When the second network node 30B receives the control signaling 32, the second network node 30B can page the wireless device 16 in the relevant area(s) with the paging identifier 34 received from the first network node 30A. Or, the second network node 30B can derive or identify a paging identifier assigned to the wireless device 16 by the second network 10B, e.g., a mapped identifier, and page the wireless device 16 with that identifier.

Consider next still other embodiments in which the first network node 30A, e.g., an AMF, is included in the first CN 14A and the second network node 30B, e.g., an eNB, is included in the second AN 12B. In these embodiments, the second network node 30B may be connected to the first network node 30A, where the first network node 30A may be responsible for mobility management but not user plane functionality, e.g., the first network node 30A may be an AMF in 5GC, not a UPF in 5GC. In this case, the second network node 30B may be able to receive paging from the first network node 30A with, e.g., a 5G-S-TMSI or I-RNTI.

Figure 3:
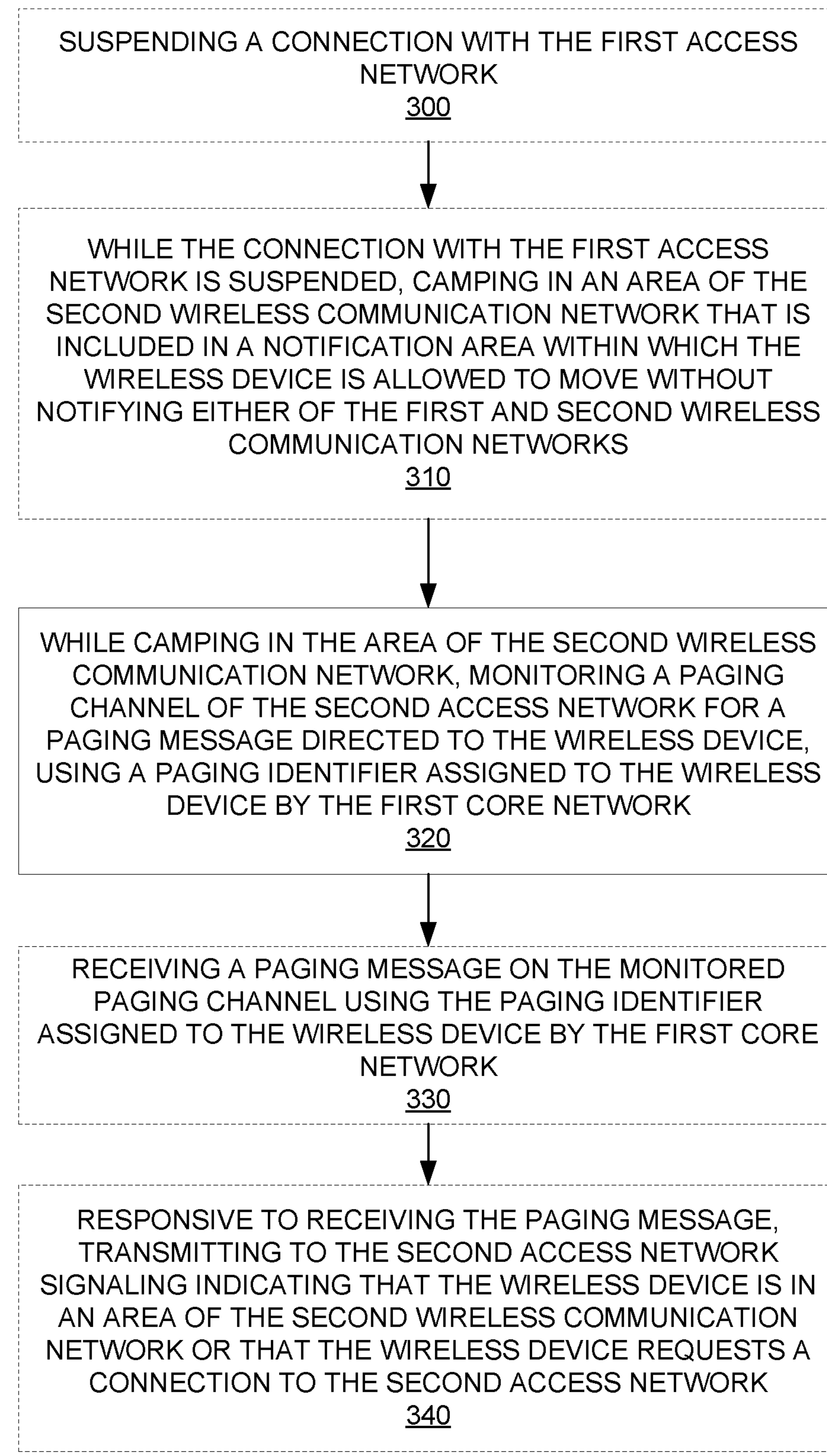
FIG. 3 is a logic flow diagram of a method performed by a wireless device according to some embodiments.

In view of the above, FIG. 3 depicts a method performed by a wireless device 16 configured to operate in first and second access networks 12A, 12B in accordance with particular embodiments. The first and second access networks 12A, 12B respectively provide access to first and second core networks 14A, 14B of different types. A first wireless communication network 10A comprises the first access network 12A and the first core network 14A. A second wireless communication network 10B comprises the second access network 12B and the second core network 14B. The method may include suspending a connection 18 with the first access network 12A (Block 300). The method may also include, while the connection 18 with the first access network 12A is suspended, camping in an area 24B of the second wireless communication network 10B that is included in a notification area 24 within which the wireless device 16 is allowed to move without notifying either of the first and second wireless communication networks 10A, 10B. The notification area 24 includes one or more areas 24A of the first wireless communication network 10A and one or more areas 24B of the second wireless communication network 10B (Block 310). The method in some embodiments further includes, while camping in the area of the second wireless communication network 10B, monitoring a paging channel 38 of the second access network 12B for a paging message 36 directed to the wireless device 16, using a paging identifier 34 assigned to the wireless device 16 by the first core network 14A (Block 320).

In some embodiments, the method further comprises receiving a paging message 36 on the monitored paging channel 38 using the paging identifier 34 assigned to the wireless device 16 by the first core network 14A (block 330). The method may also comprise, responsive to receiving the paging message 36, transmitting to the second access network 12B signaling 26 indicating that the wireless device 16 is in an area 24B of the second wireless communication network 10B or that the wireless device 16 requests a connection to the second access network 12B (Block 340).

Figure 4:
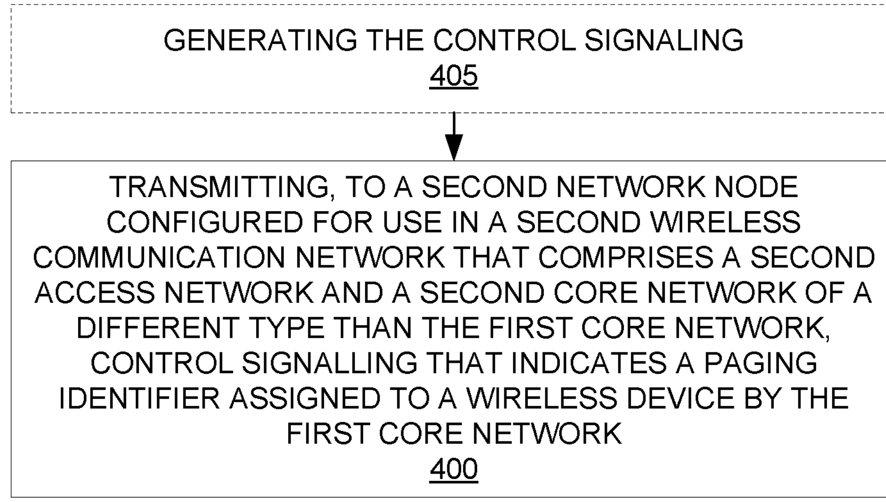
FIG. 4 is a logic flow diagram of a method performed by a first network node according to some embodiments.

FIG. 4 depicts a method performed by a first network node 30A according to some embodiments. The first network node 30A may be configured for use in a first wireless communication network 10A that comprises a first access network 12A and a first core network 14A. The method as shown comprises transmitting, to a second network node 30B configured for use in a second wireless communication network 10B that comprises a second access network 12B and a second core network 14B of a different type than the first core network 14A, control signalling 32 that indicates a paging identifier 34 assigned to a wireless device 16 by the first core network 14A (Block 400). In some embodiments, the control signalling 32 further indicates one or more areas of the second wireless communication network 10B in which the wireless device 16 is to be paged. In one or more embodiments, the method further comprises generating the control signaling (Block 405).

Figure 5:
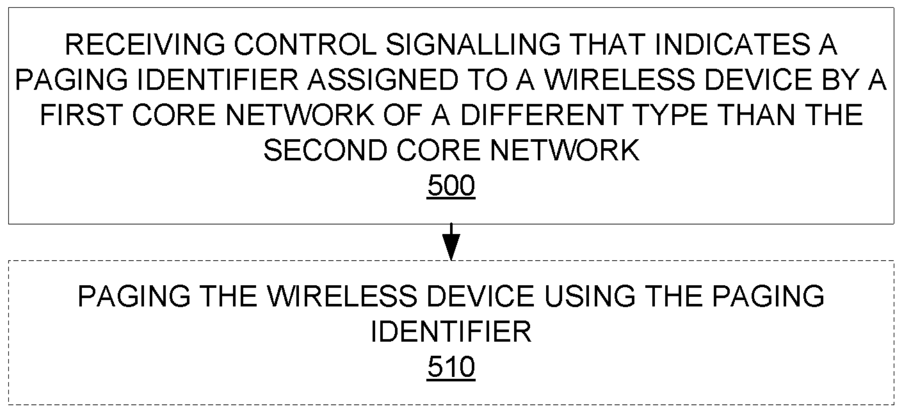
FIG. 5 is a logic flow diagram of a method performed by a second network node according to some embodiments.

FIG. 5 depicts a method performed by a second network node 30B according to some embodiments. The second network node 30B may be configured for use in a second wireless communication network 10B that comprises a second access network 12B and a second core network 14B. The method as shown comprises receiving control signalling 32 that indicates a paging identifier 34 assigned to a wireless device 16 by a first core network 14A of a different type than the second core network 14B (Block 500). In some embodiments, the control signalling 32 further indicates one or more areas of the second wireless communication network 10B in which the wireless device 16 is to be paged. In some embodiments, the method further comprises paging the wireless device 16 using the paging identifier (Block 510).

Figure 6:
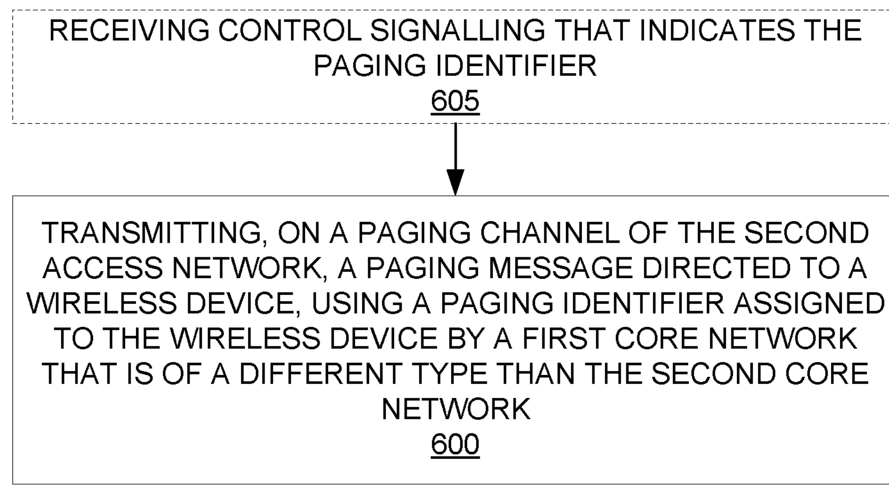
FIG. 6 is a logic flow diagram of a method performed by a second radio network node according to some embodiments.

FIG. 6 depicts a method performed by a second radio network node configured for use in a second access network 12B that provides access to a second core network 14B. The method as shown comprises transmitting, on a paging channel 38 of the second access network 12B, a paging message 36 directed to a wireless device 16, using a paging identifier 34 assigned to the wireless device 16 by a first core network 14A that is of a different type than the second core network 14B (Block 600). In some embodiments, the method further comprises receiving control signaling 32 that indicates the paging identifier 34 (Block 605).

Figure 7:
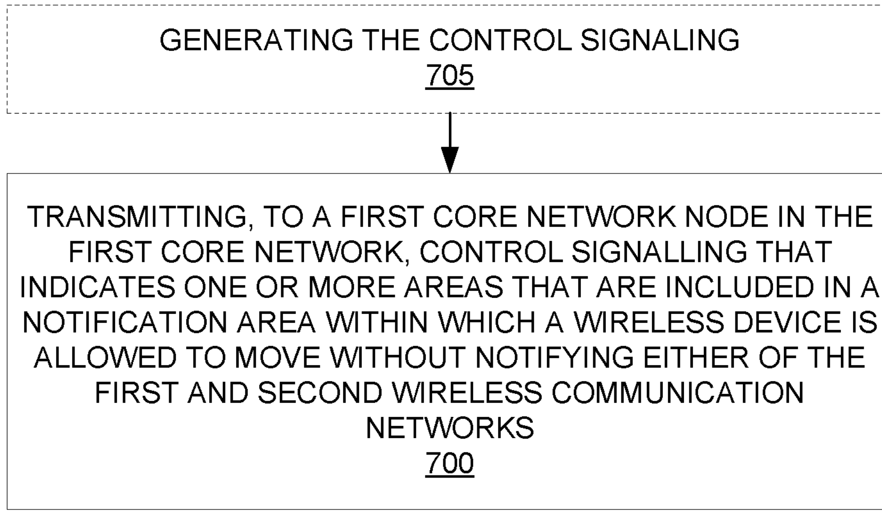
FIG. 7 is a logic flow diagram of a method performed by a first radio network node according to some embodiments.

FIG. 7 depicts a method performed by a first radio network node configured for use in a first access network 12A that provides access to a first core network 14A. A first wireless communication network 10A comprises the first access network 12A and the first core network 14A. The method as shown comprises transmitting, to a first core network node in the first core network 14A, control signalling that indicates one or more areas that are included in a notification area 24 within which a wireless device 16 is allowed to move without notifying either of the first and second wireless communication networks 10A, 10B (Block 700). The notification area 24 may include one or more areas of the first wireless communication network 10A and/or one or more areas of the second wireless communication network 10B. In some embodiments, the method also comprises generating the control signaling (Block 705).

Figure 8:
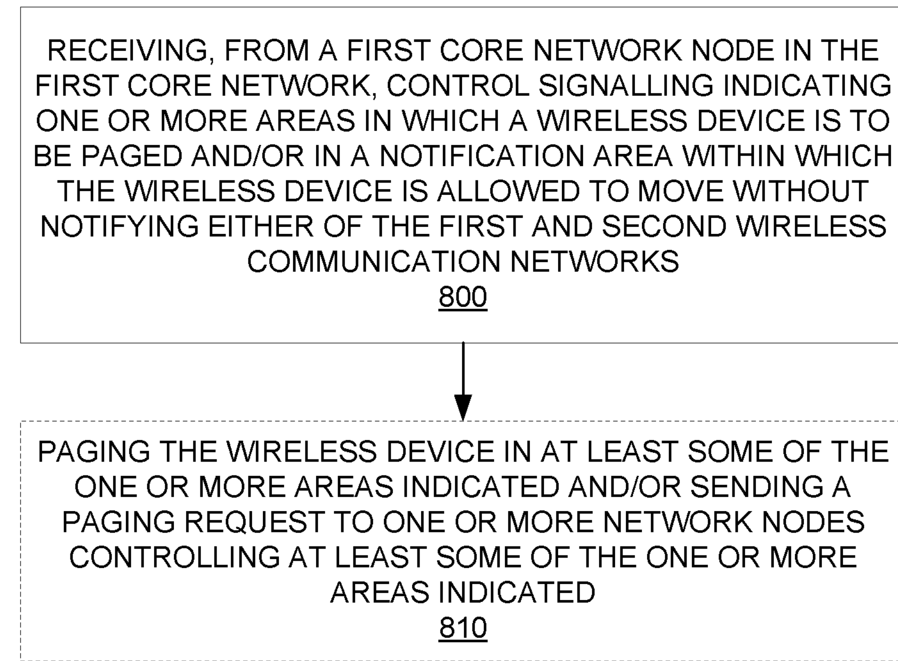
FIG. 8 is a logic flow diagram of a method performed by a first radio network node according to other embodiments.

FIG. 8 depicts a method performed by a first radio network node configured for use in a first access network 12A that provides access to a first core network 14A. A first wireless communication network 10A comprises the first access network 12A and the first core network 14A. The method as shown comprises receiving, from a first core network node in the first core network 14A, control signalling indicating one or more areas in which a wireless device 16 is to be paged and/or in a notification area 24 within which a wireless device 16 is allowed to move without notifying either of the first and second wireless communication networks 10A, 10B (Block 800). The notification area 24 may include one or more areas of the first wireless communication network 10A and/or one or more areas of the second wireless communication network 10B. In some embodiments, the method also comprises paging the wireless device 16 in at least some of the one or more areas indicated and/or sending a paging request to one or more network nodes controlling at least some of the one or more areas indicated (Block 810).

Figure 9:
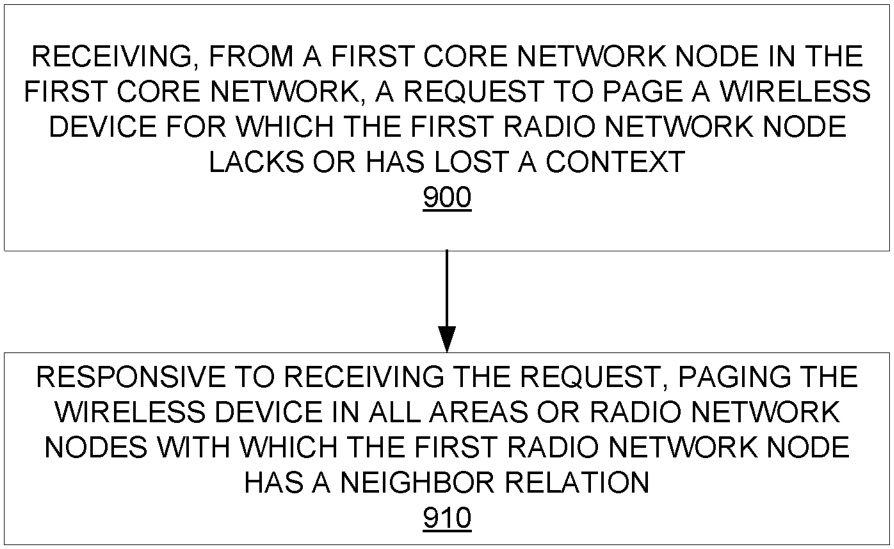
FIG. 9 is a logic flow diagram of a method performed by a first radio network node according to yet other embodiments.

FIG. 9 depicts a method performed by a first radio network node configured for use in a first access network 12A that provides access to a first core network 14A. A first wireless communication network 10A comprises the first access network 12A and the first core network 14A. The method as shown comprises receiving, from a first core network node in the first core network 14A, a request to page a wireless device 16 for which the first radio network node lacks or has lost a context (Block 900). In some embodiments, the context indicates a notification area 24 within which a wireless device 16 is allowed to move without notifying either first wireless communication network 10A or a second wireless communication network 10B. The notification area 24 may include one or more areas of the first wireless communication network 10A and/or one or more areas of the second wireless communication network 10B. The first and second wireless communication networks 10A, 10B may have core networks of different types. In some embodiments, the method further comprises, responsive to receiving the request, paging the wireless device 16 in all areas or radio network nodes with which the first radio network node has a neighbor relation (Block 910).

Figure 10:
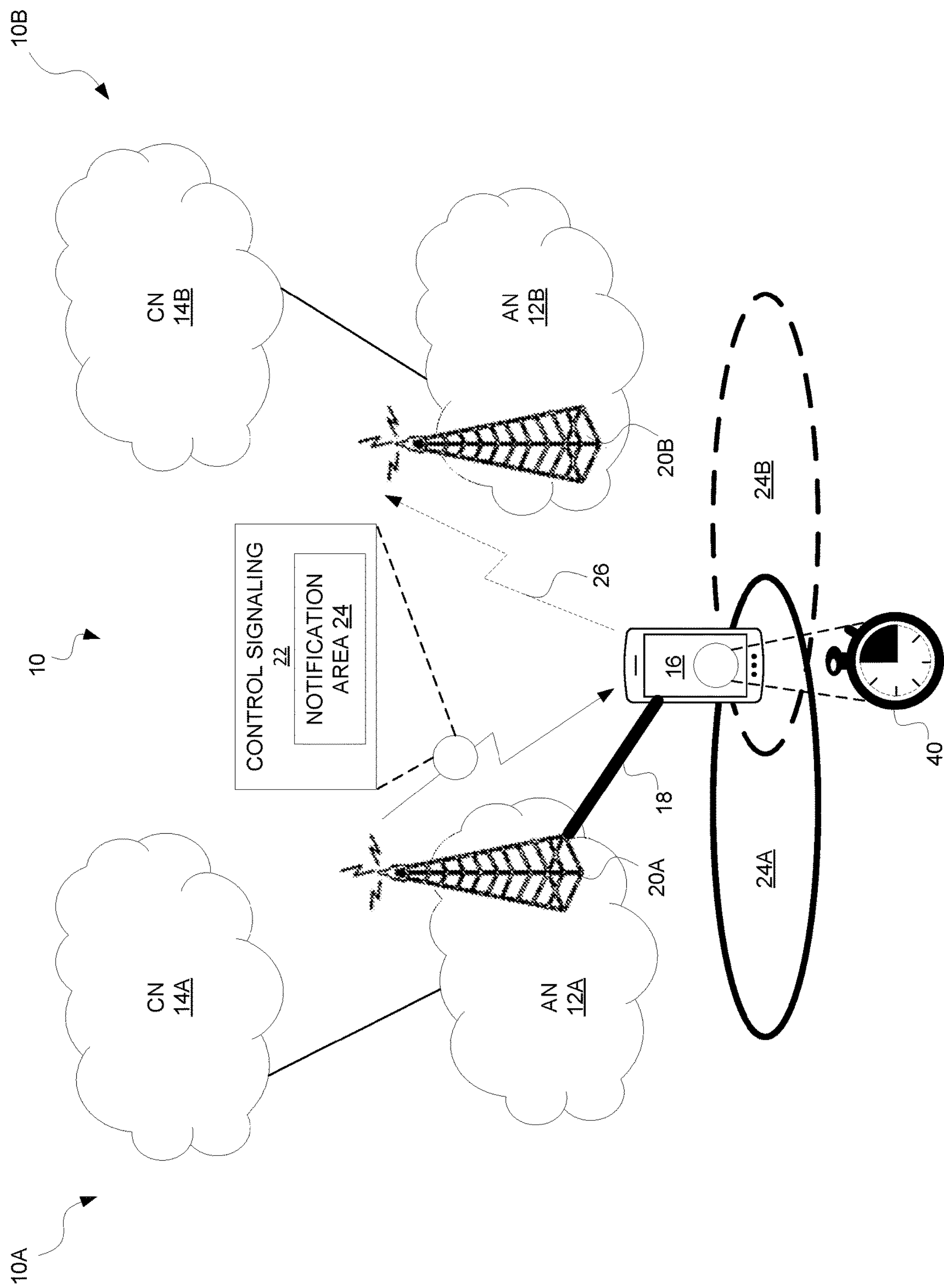
FIG. 10 is a block diagram of a wireless communication system according to some embodiments that exploit a timer at a wireless device.

FIG. 10 illustrates other embodiments that alternatively or additionally exploit a timer at the wireless device 16, in the same context described above with respect to FIG. 1. As shown in this regard, the wireless device 16 may have suspended its connection 18 with the first AN 12A, enter an inactive state, and switch from being located, e.g., camped in, an area 24A of the first wireless communication network 10A to being located an area 24B of the second wireless communication network 10B, as described above with respect to FIG. 1. This area 24B of the second wireless communication network 10B may be included in the notification area 24 within which the wireless device 16 is allowed to move without notifying either of the first and second networks 10A, 10B, as described above as well.

In FIG. 10, though, the wireless device 16 starts a timer 40 upon camping in this specific area 24B of the second wireless communication network 10B that is included in the notification area 24. In some embodiments, for example, upon camping in this area 24B of the second wireless communication network 10B, the wireless device 16 may determine whether or not the area 24B is included in the notification area 24, and decide whether or not to start the timer 40 depending respectively on whether or not the area 24B is included in the notification area 24. Responsive to expiry of the timer 40, the wireless device 16 switches from the inactive state to an idle state and/or transmits to the second AN 12B signaling 26 indicating that the wireless device 16 is in the specific area 24B of the second wireless communication network 10B or that the wireless device 16 requests a connection to the second access network 12B. In some embodiments, though, the wireless device 16 may stop or reset the timer 40, so that it does not expire and trigger transmission of signaling 26, if the wireless device 16 camps back in an area 24A of the first network 10A or if the wireless device 16 enters the idle state.

In some embodiments, then, rather than indefinitely remaining in the inactive state and/or indefinitely refraining from transmitting the signaling 26 upon camping in an area 24B of the second network 10B that is included in the notification area 24, the timer 40 effectively limits the amount of time that the wireless device 16 remains in the inactive state and/or limits the amount of time that the wireless device 16 refrains from transmitting the signaling 26. This way, if the first AN 12A loses the context for the suspended connection 18, the impact to the wireless device 16 will be limited in time. Indeed, by switching to the idle state and/or transmitting signaling 26 after some time, the wireless device 16 becomes known to the second network 10B and can therefore be paged using a paging identifier assigned to the wireless device 16 by the second network 10B. Some embodiments thereby efficiently allow the wireless device 16 to engage in mobility within the notification area 24 without that mobility necessarily triggering transmission of signaling 26, but nonetheless trigger transmission of the signaling 26 after a certain amount of time to advantageously limit the impact if the context for the suspended connection 18 is lost.

In some embodiments, the timer 40 may be started with a value corresponding to 1 minute or less in time. In other embodiments, possible values for the timer 40 may range from 1 second to 15 minutes, e.g., with possible values of 1 second, 10 seconds, 20 seconds, 30 seconds, 1 minute, 5 minutes, 10 minutes, and 15 minutes. In these and other embodiments, the wireless device 16 may receive control signaling, e.g., included in an RRC Release message, indicating the value of the timer 40.

Figure 11:
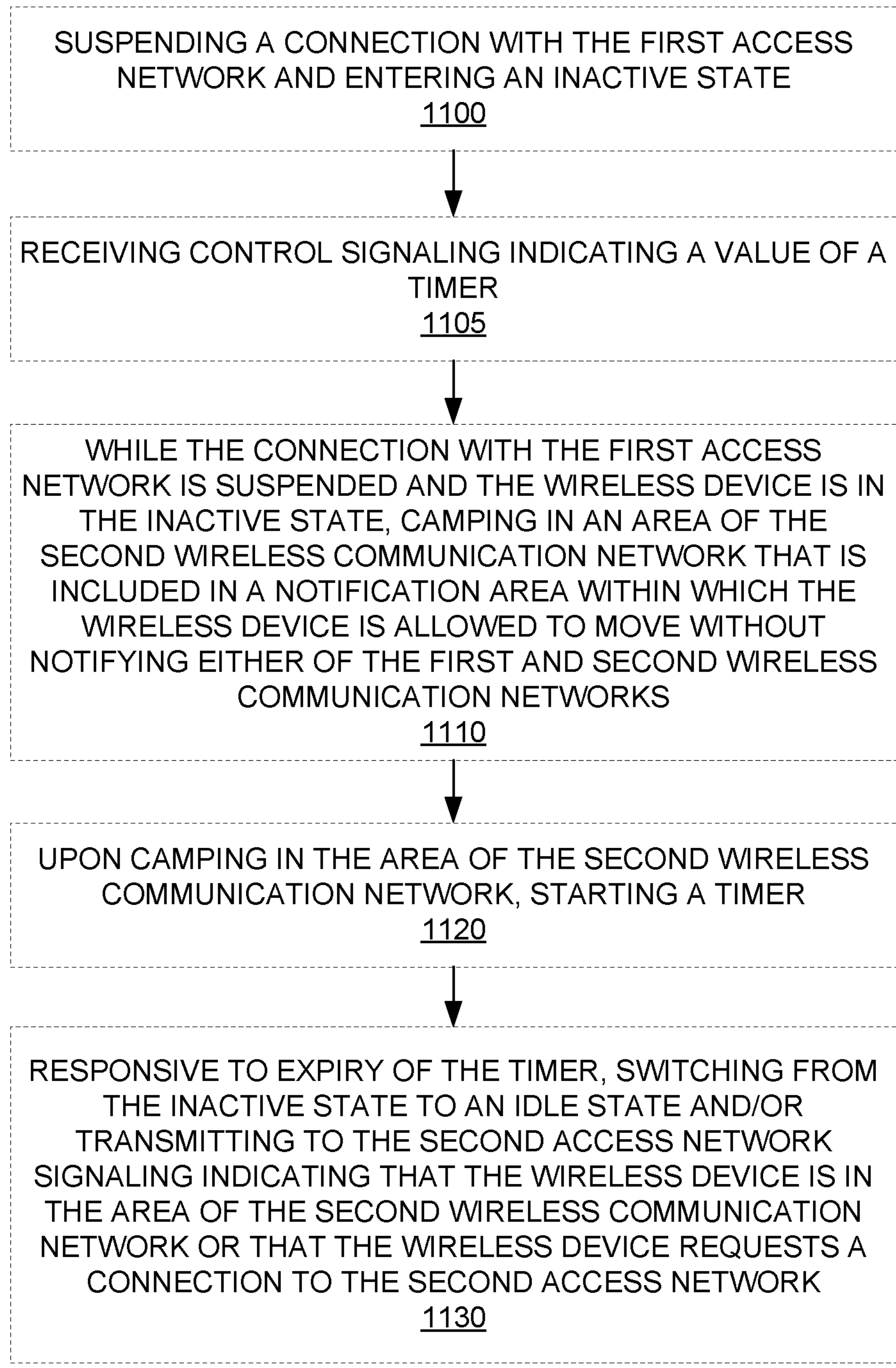
FIG. 11 is a logic flow diagram of a method performed by a wireless device according to some embodiments.

In view of these embodiments, FIG. 11 depicts a method performed by a wireless device 16 configured to operate in first and second access networks 12A, 12B in accordance with other particular embodiments. The first and second access networks 12A, 12B respectively provide access to first and second core networks 14A, 14B of different types. A first wireless communication network 10A comprises the first access network 12A and the first core network 14A. A second wireless communication network 10B comprises the second access network 12B and the second core network 14B. The method may include suspending a connection 18 with the first access network 12A and entering an inactive state (Block 1100).

The method may alternatively or additionally include receiving control signaling indicating a value of a timer 40, e.g., in the form of the new, second RNA-update timer discussed above (Block 1105). The timer 40 may be one that the wireless device 16 is to start upon the wireless device 16, while having a connection 18 suspended with the first access network 12A, camping in an area 24B of the second wireless communication network 10B that is included in a notification area 24. And that the wireless device 16 is to, upon expiry of the timer 40, switch from an inactive state to an idle state and/or transmit to the second access network 12B signaling 26 indicating that the wireless device 16 is in the area 24B of the second wireless communication network 10B or that the wireless device 16 requests a connection to the second access network 12B. The notification area 24 is an area within which the wireless device 16 is allowed to move without notifying either of the first and second wireless communication networks 10A. 10B. In some embodiments, the notification area 24 includes one or more areas of the first wireless communication network 10A and one or more areas of the second wireless communication network 10B.

Regardless, the method may alternatively or additionally include, while the connection 18 with the first access network 12A is suspended and the wireless device 16 is in the inactive state, camping in an area 24B of the second wireless communication network 10B that is included in the notification area 24 (Block 1110).

The method may alternatively or additionally include, upon camping in the area 24B of the second wireless communication network 10B, starting the timer 40, e.g., in the form of the new, second RNA-update timer discussed above (Block 1120). The method may also include, responsive to expiry of the timer 40, switching from the inactive state to an idle state and/or transmitting to the second access network 12B signaling 26 indicating that the wireless device 16 is in the area 24B of the second wireless communication network 10B or that the wireless device 16 requests a connection to the second access network 12B (Block 1130).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 12:
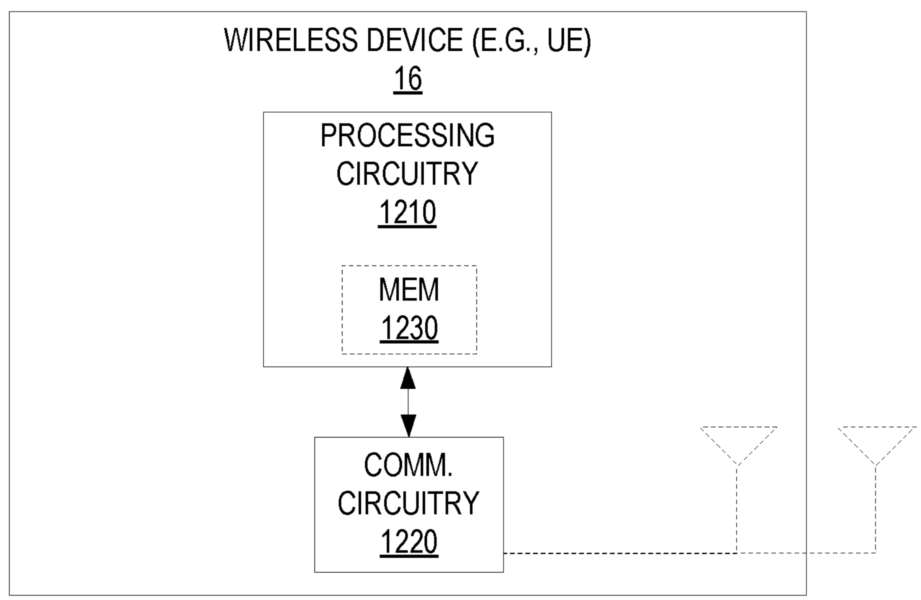
FIG. 12 is a block diagram of a wireless device according to some embodiments.

FIG. 12 for example illustrates a wireless device 16 as implemented in accordance with one or more embodiments. As shown, the wireless device 16 includes processing circuitry 1210 and communication circuitry 1220. The communication circuitry 1220, e.g., radio circuitry, is configured to transmit and/or receive information to and/or from one or more other nodes, e.g., via any communication technology. Such communication may occur via one or more antennas that are either internal or external to the wireless device 16. The processing circuitry 1210 is configured to perform processing described above, e.g., in FIG. 3 and/or FIG. 11, such as by executing instructions stored in memory 1230. The processing circuitry 1210 in this regard may implement certain functional means, units, or modules.

Figure 13:
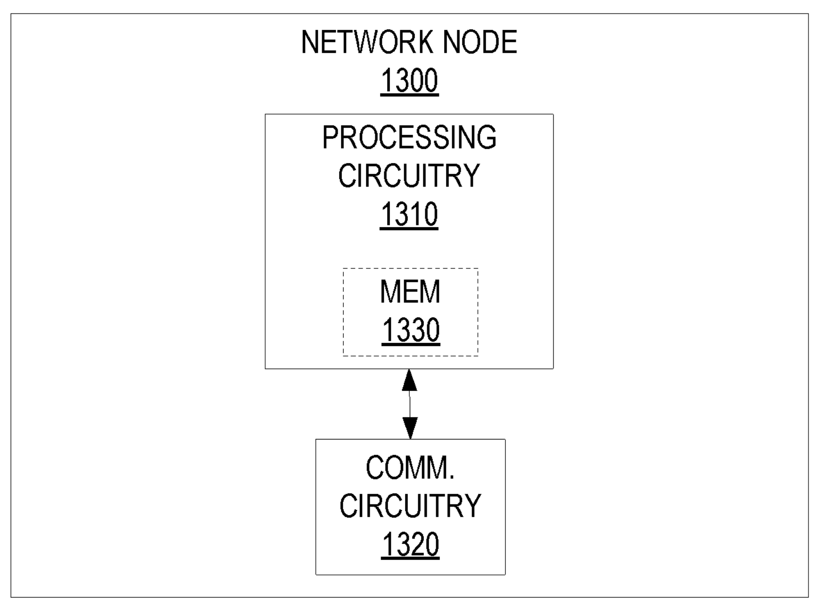
FIG. 13 is a block diagram of a network node according to some embodiments.

FIG. 13 illustrates a network node 1300, e.g., a first network node 30A or a second network node 30B, as implemented in accordance with one or more embodiments. As shown, the network node 1300 includes processing circuitry 1310 and communication circuitry 1320. The communication circuitry 1320 is configured to transmit and/or receive information to and/or from one or more other nodes, e.g., via any communication technology. The processing circuitry 1310 is configured to perform processing described above, e.g., in any of FIGS. 4-9, such as by executing instructions stored in memory 1330. The processing circuitry 1310 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Note that, according to some embodiments herein, a notification area within which a wireless device with a suspended access network connection is allowed to move without transmitting control signalling includes areas of multiple wireless communication networks, e.g., one of which supports suspended access network connections and one of which lacks such support. Accordingly, mobility of the wireless device within the notification area, even if that mobility involves mobility between the wireless communication networks, will not trigger the device to transmit signalling, e.g., in the form of a location update or connection request. And this may be the case even if the source network, e.g., NR/5GC, supports suspended access network connections but the target network, e.g., LTE/EPC, lacks such support.

Moreover, according to some embodiments, the wireless device may preserve the context for any connection that the device has suspended with the source access network, even after the device has engaged in mobility to a target network, e.g., that lacks support for suspended connections. This way, if the device engages in mobility back to the original source access network, e.g., before establishing a connection with the original target access network, the device may resume the connection with the original source access network using the preserved context. But, if the device at some point becomes active in the original target access network such as through connection establishment, the device may then discard the context, e.g., so as to fallback to the target network that lacks support for suspended connections.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 14:
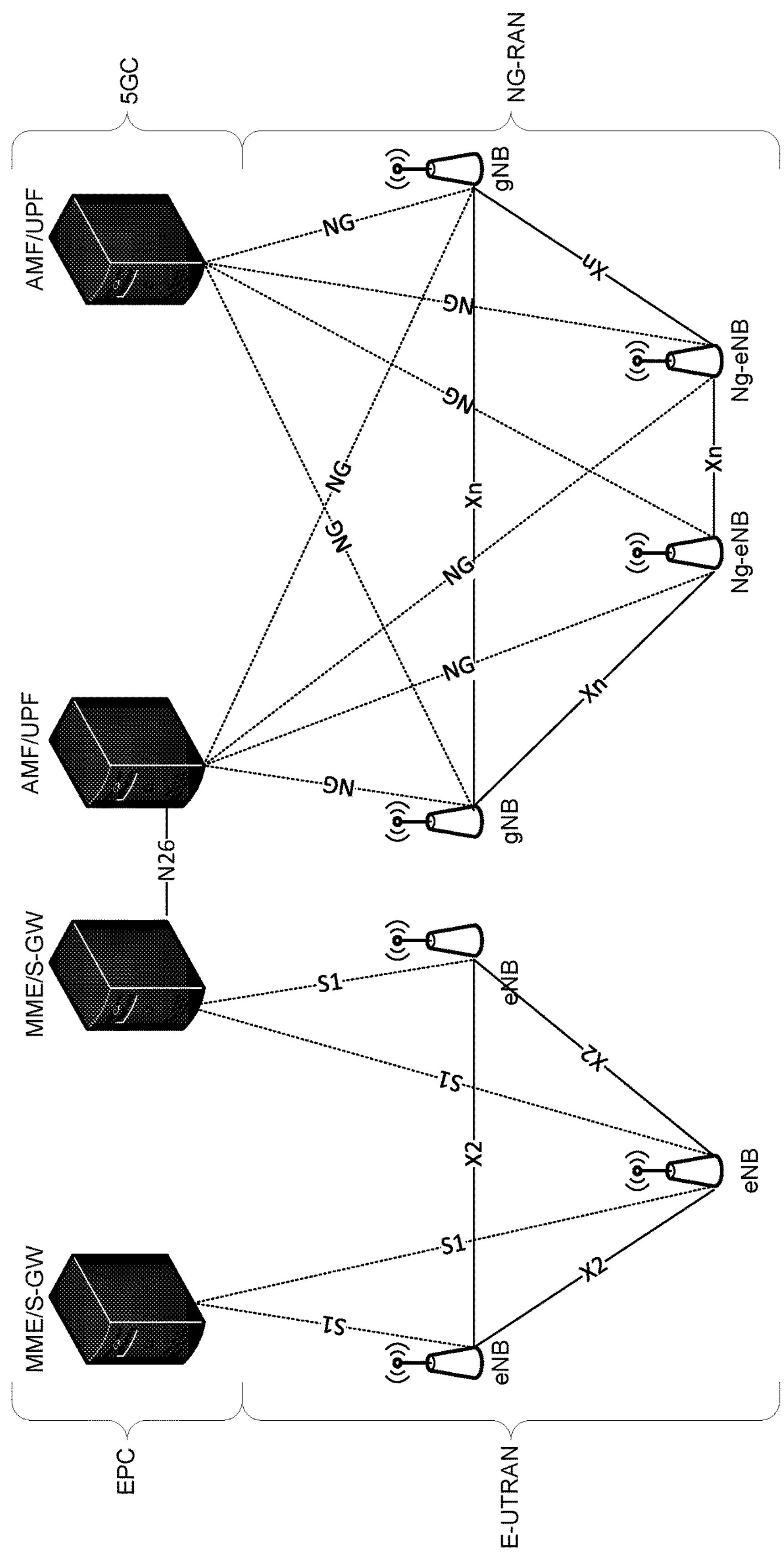
FIG. 14 is a block diagram of an E-UTRAN/EPC network and a NG-RAN/5GC network according to some embodiments.

3GPP has decided to introduce both a new core network (5GC) and a new Radio Access Technology (NR) in the 5G system (5GS). However, the core network, 5GC, will also support other Radio Access Technologies (RATs) than New Radio (NR), namely Evolved UMTS Terrestrial Radio Access (E-UTRA). FIG. 14 shows the network architecture for the Evolved Packet System (EPS) and 5GS. As shown, E-UTRAN comprises Long Term Evolution (LTE) nodes (eNBs) connected to the Evolved Packet Core (EPC), and the Next Generation Radio Access Network (NG-RAN) comprising LTE nodes (ng-eNB) and NR nodes (gNB) connected to the 5G Core (5GC).

The LTE node connected to EPC (LTE/EPC) can be interconnected with the X2 interface, while the NG-RAN nodes (NR and LTE/5GC) can be interconnected with the Xn interface. 3GPP has also introduced an interface between the Mobility Management Entity (MME) in EPC and the Access and Mobility Function (AMF) in 5GC called N26, which enables interworking between EPC and 5GC.

Figure 15:
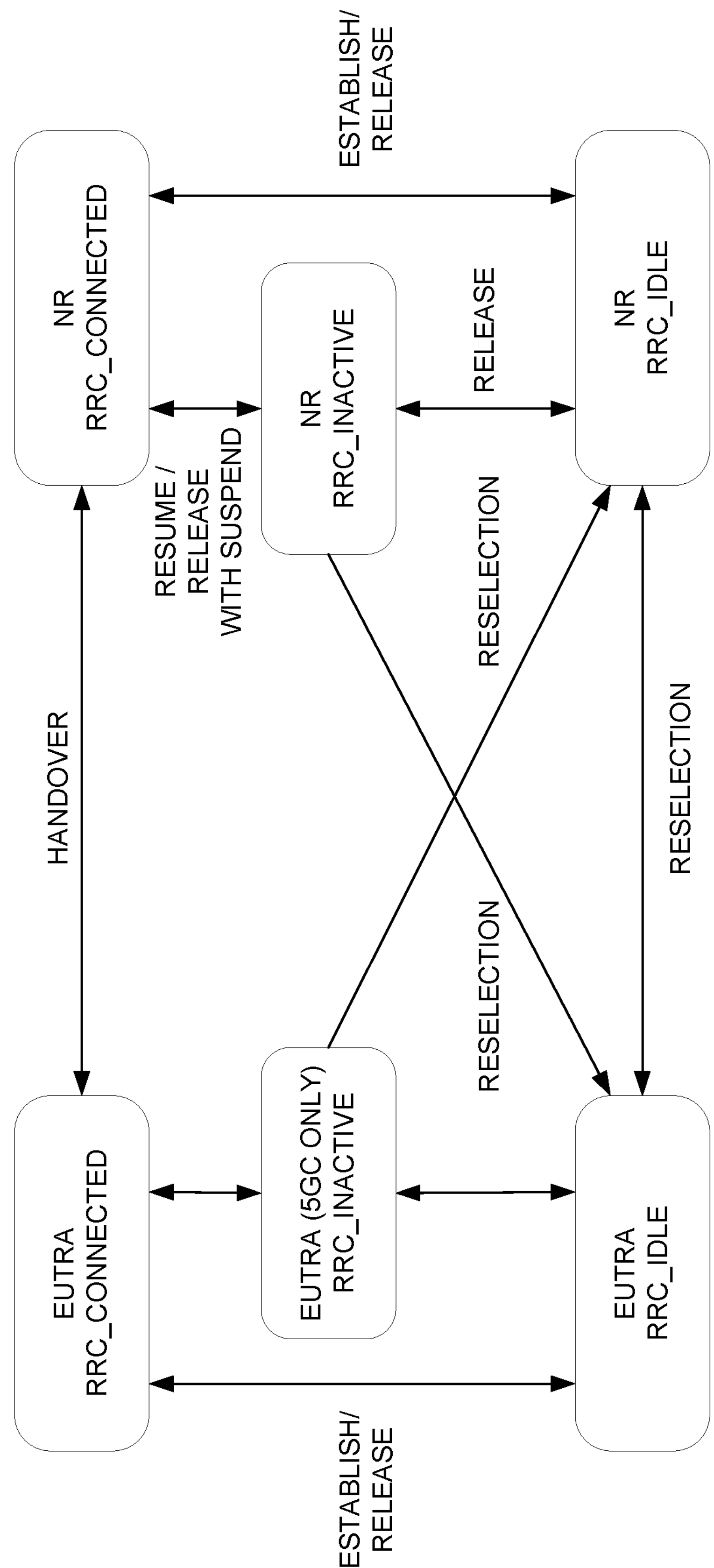
FIG. 15 is a block diagram of RRC state transitions according to some embodiments.

Currently in LTE (E-UTRA) connected to EPC or 5GC and NR, the state transitions shown in FIG. 15 are supported. FIG. 15 in this regard shows a UE state machine and state transitions between NR/5GC, E-UTRA/EPC and E-UTRA/5GC. The RRC_INACTIVE state and the associated state transitions are only available for NR/5GC and E-UTRA/5GC.

As can be seen, it is possible to move an ongoing UE connection (UE is in RRC_CONNECTED) between the two RATs using a handover procedure. Additionally (not shown) it is possible for the network to move the UE to the other RAT by sending a Release message with re-direct information. When the UE is in IDLE or INACTIVE state, the cell reselection procedure will be used when transitioning between the RATs.

In addition, FIG. 15 shows the new RRC state RRC_INACTIVE introduced in Rel-15 for both NR and LTE/5GC. In RRC_INACTIVE, the UE stores certain configurations, e.g. data radio bearer (DRB) configurations and physical layers parameters. When the UE need to resume the connection, it transmits a RRCConnectionResumeRequest or RRCResumeRequest in LTE and NR respectively. The UE can then reuse the stored settings and reduce the time and signaling needed to properly operate in RRC_CONNECTED (as in RRC_INACTIVE security and CN connection are restored upon resume).

Note that, in NR, an equivalent message exists for the case of long I-RNTI of 40 bits used as UE identifier RRCResumeRequest1, associated to a different logical channel compared to the short I-RNTI used in the RRCResumeRequest message.

In Rel-15 (first release) of the NG-RAN standard, it has been agreed to not support direct transition between RRC_INACTIVE in LTE/5GC and RRC_INACTIVE in NR. Hence, a Rel-15 UE in RRC_INACTIVE in one RAT performing cell reselection to the other RAT would trigger the UE to release its access stratum (AS) context, enter RRC_IDLE and perform a Registration Area Update.

To suspend a UE from RRC_CONNECTED to RRC_INACTIVE, the source node prepares an RRCRelease (in NR) message which contain configurations for the RRC_INACTIVE state. In NR, this message is the RRCRelease message with the suspendConfig which contains configurations for a RAN Notification Area (RNA), which can either consists of a list of cells, or a list of RAN Area configurations comprising a tracking area code (TAC) and possibly including a list of RAN Area Codes (RANACs).

This is encoded in RRC NR as follows:

```
RAN-NotificationAreaInfo ::=        CHOICE {
  cellList                          PLMN-RAN-AreaCellList,
  ran-AreaConfigList                PLMN-RAN-AreaConfigList,
  ...
}
```

First, there is the option between cellist or ran-AreaConfigList. In the case of cell list, there is the possibility to signal a common public land mobile network (PLMN) for a list of cells, or different PLMNs per cell.

```
PLMN-RAN-AreaCellList ::=          SEQUENCE (SIZE (1.. maxPLMNIdentities)) OF
PLMN-RAN-AreaCell
PLMN-RAN-AreaCell ::=            SEQUENCE {
  plmn-Identity                PLMN-Identity
OPTIONAL,   -- Need S
  ran-AreaCells                SEQUENCE (SIZE (1..32)) OF CellIdentity
}
```

And, each RAN area configuration in the list has a TAC. Hence, the network may configure the UE with a list of TAI (Tracking Area Identifiers=TAC+PLMN) or a list of RAN area identifiers where each RAN Area Identifier is comprised by a TAC+RANAC.

```
PLMN-RAN-AreaConfigList ::=          SEQUENCE (SIZE (1..maxPLMNIdentities)) OF
PLMN-RAN-AreaConfig
PLMN-RAN-AreaConfig ::=            SEQUENCE {
  plmn-Identity                PLMN-Identity
OPTIONAL,   -- Need S
  ran-Area                     SEQUENCE (SIZE (1..16)) OF RAN-AreaConfig
}
RAN-AreaConfig ::=               SEQUENCE {
  trackingAreaCode             TrackingAreaCode,
  ran-AreaCodeList             SEQUENCE (SIZE (1..32)) OF RAN-AreaCode
OPTIONAL   -- Need R
}
```

Whenever a UE in RRC_INACTIVE reselects to a new cell, based on measurements, the UE checks whether the target cell belong to the configured RNA by checking the system information (namely, system information block #1, SIB1) from the target cell. If the SIB1 contains the cell Identity or the RAN Area Code (RANAC) included in the RNA list of cells or RAN Area Codes respectively, the UE will remain in RRC_INACTIVE without performing any signaling. Since the RAN is aware that the UE is configured with a set of cells/RANACs, the UE doesn't need to inform the network as long as it remains within the RNA. If the network needs to page the UE, e.g. due to incoming downlink (DL) data or a voice call, the core network will address the source node (which suspended the UE) and the source node may perform a RAN paging across the cells inside the RNA. In the case the RNA is made up of cells belonging to different RAN nodes, the source RAN node will send an Xn page message to the other RAN nodes serving the RNA so that these RAN nodes can page within their own cells. Since the RAN node only pages in the RNA, it is important for the RAN to know when the UE moves outside the configured RNA configuration for reachability reasons.

However, if the UE reselects to a target cell which does not belong to the RNA configuration at the UE (based on cell Id or TAC/RANAC), the UE will either perform a RAN Area Update, i.e. transmit a Resume Request like message (RRCResumeRequest/RRCResumeRequest1 with the ResumeCause value ranAreaUpdate) or perform a non-access stratum (NAS) procedure (e.g. Tracking/Registration Area Update) by transmitting a Resume message with the ResumeCause in accordance with the NAS message (this occurs in case the UE leaves a cell and enters both a new RAN area and new registration area). In either case, the network will decide upon reception of the Resume Request message whether to keep the UE in RRC_CONNECTED, or to release the UE back to RRC_INACTIVE with updated configurations or to release the UE to RRC_IDLE (other options are also possible e.g. reject the UE with wait time, in case of overload).

RRC Release Message in NR

As can be seen in the message below, the RRCRelease message in NR contain a suspendConfig information element (IE). The suspendConfig comprise a RAN notification Area (RNA) configuration which comprise either a list of cells, or a list of RAN Area Codes (RANACs), which may also be a list of tracking areas.

RRCRelease in NR (TS. 38.331 v 15.4.0)

RRCRelease Message

```
-- ASN1START
-- TAG-RRCRELEASE-START
RRCRelease ::=                     SEQUENCE {
  rrc-TransactionIdentifier          RRC-TransactionIdentifier,
  criticalExtensions                 CHOICE {
    rrcRelease                        RRCRelease-IEs,
    criticalExtensionsFuture            SEQUENCE { }
  }
}
RRCRelease-IEs ::=                 SEQUENCE {
  redirectedCarrierInfo              RedirectedCarrierInfo        OPTIONAL,   -- Need N
  cellReselectionPriorities          CellReselectionPriorities    OPTIONAL,   -- Need R
  suspendConfig                      SuspendConfig                OPTIONAL,   -- Need R
```

-continued

```
  deprioritisationReq                     SEQUENCE {
    deprioritisationType                    ENUMERATED {frequency, nr},
    deprioritisationTimer                   ENUMERATED {min5, min10, min15, min30}
  } OPTIONAL,   -- Need N
  lateNonCriticalExtension                  OCTET STRING                    OPTIONAL,
  nonCriticalExtension                      RRCRelease-v1540-IEs            OPTIONAL
}
RRCRelease-v1540-IEs ::=                  SEQUENCE {
  waitTime                            RejectWaitTime                OPTIONAL, -- Need N
  nonCriticalExtension                  SEQUENCE { }                OPTIONAL
}
RedirectedCarrierInfo ::=                CHOICE {
  nr                              CarrierInfoNR,
  eutra                             RedirectedCarrierInfo-EUTRA,
  ...
}
RedirectedCarrierInfo-EUTRA ::=             SEQUENCE {
  eutraFrequency                          ARFCN-ValueEUTRA,
  cnType-r15                          ENUMERATED {epc,fiveGC}              OPTIONAL -- Need N
}
CarrierInfoNR ::=                       SEQUENCE {
  carrierFreq                           ARFCN-ValueNR,
  ssbSubcarrierSpacing                        SubcarrierSpacing,
  smtc                              SSB-MTC                      OPTIONAL,   -- Need S
  ...
}
SuspendConfig ::=                        SEQUENCE {
  fullI-RNTI                          I-RNTI-Value,
  shortI-RNTI                           ShortI-RNTI-Value,
  ran-PagingCycle                           PagingCycle,
  ran-NotificationAreaInfo                    RAN-NotificationAreaInfo          OPTIONAL,   -- Need M
  t380                              PeriodicRNAU-TimerValue               OPTIONAL,   -- Need R
  nextHopChainingCount                          NextHopChainingCount,
  ...
}
PeriodicRNAU-TimerValue ::=                   ENUMERATED { min5, min10, min20, min30,
min60, min120, min360, min720}
CellReselectionPriorities ::=                SEQUENCE {
  freqPriorityListEUTRA                     FreqPriorityListEUTRA             OPTIONAL,   -- Need M
  freqPriorityListNR                      FreqPriorityListNR                OPTIONAL,   -- Need M
  t320                              ENUMERATED {min5, min10, min20, min30, min60,
min120, min180, spare1}                 OPTIONAL,      -- Need R
  ...
}
PagingCycle ::=                         ENUMERATED {rf32, rf64, rf128, rf256}
FreqPriorityListEUTRA ::=               SEQUENCE (SIZE (1..maxFreq)) OF FreqPriorityEUTRA
FreqPriorityListNR ::=                  SEQUENCE (SIZE (1..maxFreq)) OF FreqPriorityNR
FreqPriorityEUTRA ::=                      SEQUENCE {
  carrierFreq                           ARFCN-ValueEUTRA,
  cellReselectionPriority                     CellReselectionPriority,
  cellReselectionSubPriority                  CellReselectionSubPriority  OPTIONAL -- Need R
}
FreqPriorityNR ::=                      SEQUENCE {
  carrierFreq                           ARFCN-ValueNR,
  cellReselectionPriority                     CellReselectionPriority,
  cellReselectionSubPriority                  CellReselectionSubPriority   OPTIONAL  -- Need R
}
RAN-NotificationAreaInfo ::=                 CHOICE {
  cellList                          PLMN-RAN-AreaCellList,
  ran-AreaConfigList                        PLMN-RAN-AreaConfigList,
  ...
}
PLMN-RAN-AreaCellList ::=                     SEQUENCE (SIZE (1.. maxPLMNIdentities)) OF
PLMN-RAN-AreaCell
PLMN-RAN-AreaCell ::=                       SEQUENCE {
  plmn-Identity                         PLMN-Identity      OPTIONAL,   -- Need S
  ran-AreaCells                           SEQUENCE (SIZE (1..32)) OF CellIdentity
}
PLMN-RAN-AreaConfigList ::=                   SEQUENCE (SIZE (1..maxPLMNIdentities)) OF
PLMN-RAN-AreaConfig
PLMN-RAN-AreaConfig ::=                       SEQUENCE {
  plmn-Identity                         PLMN-Identity      OPTIONAL,   -- Need S
  ran-Area                            SEQUENCE (SIZE (1..16)) OF RAN-AreaConfig
}
RAN-AreaConfig ::=                      SEQUENCE {
  trackingAreaCode                      TrackingAreaCode,
  ran-AreaCodeList                      SEQUENCE (SIZE (1..32)) OF RAN-AreaCode
                                          OPTIONAL   -- Need R
}
```

-continued

```
-- TAG-RRCRELEASE-STOP
-- ASN1STOP
```

Consider now inter-RAT mobility when the UEs are in RRC_IDLE and/or RRC_INACTIVE.

An RRC_IDLE UE in NR, upon reselecting to an LTE cell, shall enter in RRC_IDLE in LTE. If the target LTE cell is connected to 5GC (5GC only), with only a 5GC TAC associated, that may either be part of the UE's TAI list or not. In other words, the UE may either trigger a Registration Area Update or not, depending whether the LTE cell is in its TAI list.

Heretofore, in the case the target cell is an LTE EPC only cell, on the other hand, that cell may not be on the UE's TAI list since the cells is served by a different core network. Furthermore, EPC NAS only supports a 16 bits TAC, while 5GC has a 24 bits TAC. In other words, upon entering RRC_IDLE in EPC, there will always be a Tracking Area Update. No paging between core network has heretofore been supported between 5GC and EPC.

In the case the target cell is both an LTE EPC and 5GC cell, as long as at least one of the TACs is in the UE's TAI list, there will be no Registration/Tracking Area Updates, i.e., no signalling.

In the case the UE is in RRC_INACTIVE in NR and performs inter-RAT cell reselection to an LTE cell, the UE heretofore shall always transition to RRC_IDLE in LTE, regardless if that is an LTE EPC only cell, or a LTE 5GC only cell or both LTE 5GC/EPC cell.

In the latest version of the 3GPP specifications, that is translated as follows:

5.3.13.Y Inter RAT Cell Reselection

Upon reselecting to an inter-RAT cell, the UE shall:

1> perform the actions upon going to RRC_IDLE as specified in 5.3.11, with release cause 'other'.

According to the 3GPP specifications, if the target LTE cell is connected to 5GC (i.e. same CN as the NR cell) and that has a TAC in the UE's TAI list, there will be no Registration Area Update. If the target LTE cell is only connected to EPC (i.e. different CN as the NR cell), regardless of its TAC, there will always be a Tracking Area Update.

RRC State Transition Notification

In 5GC, the AMF can request the gNB to report any state transitions while the UE performs. Once the AMF has request this information from the gNB, the gNB will continue to report the state transition until the UE transitions to CM-IDLE or the AMF cancels the request. This is captured in TS 23.502 (v15.4.1) section 4.8.3 Notification procedure as seen below.

4.8.3 N2 Notification Procedure

This procedure is used by an AMF to request the NG-RAN to report RRC state information, when the target UE is in CM-CONNECTED state. When AMF has requested reporting of subsequent state changes, the need for the NG-RAN to continue reporting ceases when the UE transitions to CM-IDLE or the AMF sends a cancel indication. This procedure may be used for services that require RRC state information (e.g. 5GC MT control and paging assistance, O&M and collection of statistics), or for subscription to the service by other NFs. See TS 38.413 for details of the procedure.

Reporting of RRC state transitions can be requested per UE by AMF. Continuous reporting of all RRC state transitions can be enabled by operator local configuration.

Figure 16:
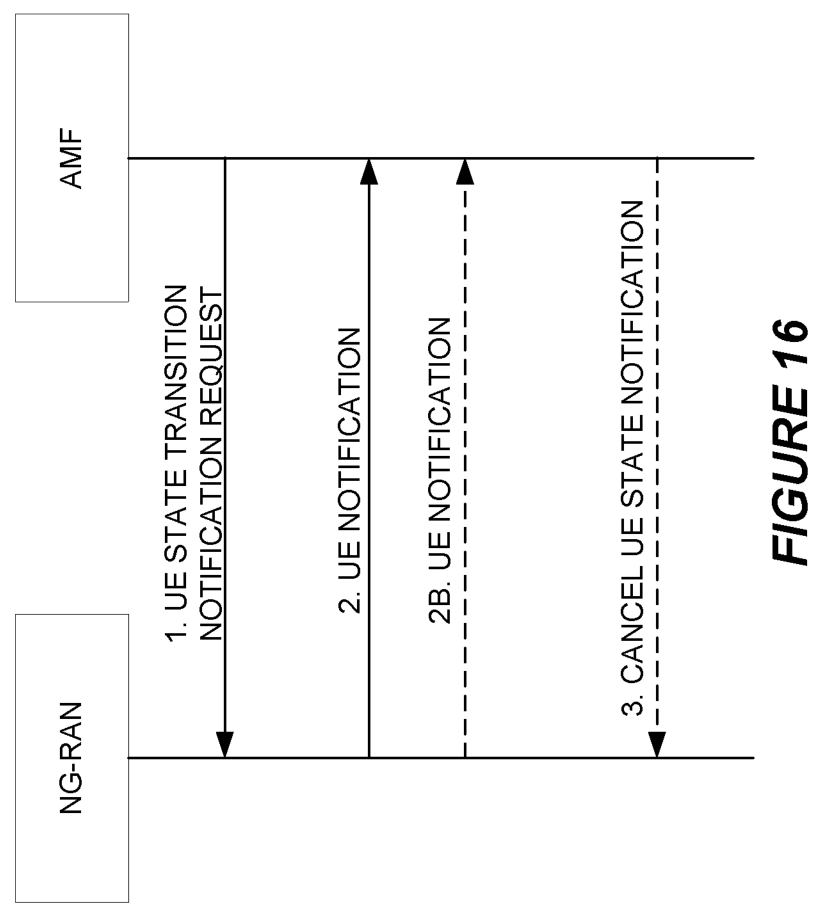
FIG. 16 is a call flow diagram of UE state transition notification between NG-RAN and AMF according to some embodiments.

FIG. 16 shows RRC state transition notification.

1. The AMF sends a UE State Transition Notification Request to the NG-RAN as described in TS 38.413. The UE State Transition Notification Request message shall identify the UE for which notification(s) are requested, and may contain a reporting type. The reporting type either indicates subsequent state transitions shall be notified at every RRC state transition (i.e. from RRC Connected state to RRC Inactive state, or from RRC Inactive to RRC Connected state), or it indicates Single RRC-Connected state notification.
2. The NG-RAN sends the UE Notification message to report the current RRC state for the UE (i.e. RRC Inactive state or RRC Connected state). The current UE location information (i.e. TAI+Cell Identity) is always included when RRC state information is reported.

2b. When the AMF has requested reporting about subsequent state transitions, the NG-RAN sends subsequent UE Notification messages to the AMF at every RRC state transition until the UE transitions to CM-IDLE or NG-RAN receives a Cancel UE State Notification message from the AMF. When the AMF has requested reporting for Single RRC-Connected state notification and UE is in RRC-Connected state, the NG-RAN sends one UE Notification message but no subsequent messages. If UE is in RRC-Inactive state, the NG-RAN sends one UE Notification message plus one subsequent UE Notification message when RRC state transits to RRC-Connected.

3. The AMF can send a Cancel UE State Notification message to inform the NG-RAN that it should terminate notifications for a given UE. This message should only be used when notification(s) about subsequent state transitions was requested at every RRC state transition.

Consider now one solution based on inter-system RAN notification area in NR. Heretofore, if a UE is suspended to RRC_INACTIVE and reselects to an E-UTRA/EPC cell, it would directly transition to RRC_IDLE and perform a tracking area update or registration update in EPC.

In some embodiments, signalling is reduced for a UE in NR RRC_INACTIVE which re-selects to an E-UTRA/EPC cell. These embodiments may extend the RAN Notification area to comprise both LTE/EPC and NR cells:

```
RAN-NotificationAreaInfo ::=          CHOICE {
  cellList                          PLMN-RAN-AreaCellList,
  ran-AreaConfigList                    PLMN-RAN-AreaConfigList,
  ...
  [[ cellListinterRAT                  PLMN-RAN-AreaCellListInterRAT,
  ]]
}
```

-continued

```
PLMN-RAN-AreaCellListInterRAT ::=                    SEQUENCE (SIZE (1.. maxPLMNIdentities))
OF PLMN-RAN-AreaCellInterRAT
PLMN-RAN-AreaCellInterRAT ::=                    SEQUENCE {
  plmn-Identity                              PLMN-Identity
OPTIONAL,   -- Need S
  ran-AreaCells                              SEQUENCE (SIZE (1..32)) OF CellIdentityInterRAT
}
CellIdentityInterRAT ::=                  CHOICE {
  nr-Cell                              CellIdentity,
  eutra-Cell                              BIT STRING ( SIZE (28))
}
```

Some embodiments may also forward RAN paging over X2 from the source (NR) gNB to the configured (LTE/EPC) eNBs in the RAN Notification Area, include a UE context retrieval request response, and forward downlink data over X2 which triggered the RAN paging.

There currently exist certain challenge(s). There exists challenges to enable the UE in NR RRC_INACTIVE to become reachable by the network via RAN paging while camping in an E-UTRA/EPC cell.

More particularly, a UE in NR RRC_CONNECTED is suspended to RRC_INACTIVE and is configured with both NR and at least one E-UTRA/EPC cell in the RAN Notification Area. The UE monitors a paging channel in configured paging occasions and looks for its identifier (an I-RNTI assigned in the RRC Release like message). The UE may be reached in RRC_INACTIVE state via RAN paging (e.g. due to DL data arriving in the source gNB).

The RAN may lose the UE Inactive AS Context for any number of reasons, e.g. due to a failure in the gNB such as a system reboot, mechanical failure, malicious interference, etc. If the RAN indeed loses the UE Inactive AS context, the CN connection with 5GC, e.g. with the AMF, is also released. Hence, if DL data arrives to the CN, the typical way to reach the UE is via CN paging. That is possible thanks to the fact that the UE in INACTIVE state monitors RAN and CN paging with both RAN and CN identifiers and in overlapping paging occasions.

However, if that problem happens, i.e. RAN loses the UE Inactive AS context, and, while the UE performs cell reselection to an E-UTRA/EPC cell, the network cannot page the UE with the 5G-S-TMSI in the paging occasions being monitored by the UE since paging should be done in this case by the 5GC, which does not have an interface with the LTE/EPC cell the UE is camping on. Also, the RAN paging identity, e.g. I-RNTI, was only known by the source gNB which had a failure. Thus, the UE would be unreachable as long as it camps in an E-UTRA/EPC cell without contacting the network.

Certain aspects of the present disclosure and their embodiments may provide solutions to these or other challenges. Embodiments herein include several solutions for how to prevent a UE from becoming unreachable in case UE Inactive AS context is lost in RAN while UE is in NR RRC_INACTIVE, configured with both NR and E-UTRA/EPC cells. Embodiments herein for example include those listed below, any of which may be used together in combination or separately:

1. As a specific example of the embodiments illustrated in FIG. 2, EN-DC X2 is enhanced to allow forwarding of paging comprising 5G-S-TMSI and E-UTRA/EPC eNB can page with either I-RNTI or 5G-S-TMSI.
2. As another specific example of the embodiments illustrated in FIG. 2, N26 interface (between AMF and MME) is enhanced to allow inter-system paging.
3. As yet another specific example of the embodiments illustrated in FIG. 2, E-UTRA/EPC eNBs are connected to 5GC only to receive paging from 5G-S-TMSI.
4. As a specific example of the embodiments illustrated in FIG. 10, a new (second) RNA-update timer is introduced. This timer starts when a UE re-selects to an E-UTRA/EPC cell in the RNA while in RRC_INACTIVE. If the UE re-selects to an NR cell, the timer stops. If the timer expires, the UE goes to RRC_IDLE.

Some embodiments for example comprise one or more the following UE actions. Upon reselecting to an E-UTRA/EPC cell belonging to the configured RAN Notification Area, begin monitoring E-UTRA paging channel for the configured I-RNTI and 5G-S-TMSI. Upon reception of I-RNTI or 5G-S-TMSI in a paging message from E-UTRA/EPC cell, the UE shall go to RRC_IDLE and trigger a registration request or tracking area update in the target cell. Upon suspending to RRC_INACTIVE, the UE receives a timer value. Upon re-selecting to an E-UTRA/EPC cell inside the RAN Notification area, the UE starts a timer with the received timer value. If the timer expires, the UE enters RRC_IDLE and performs a tracking area update/registration update in EPC. The timer is stopped if the UE re-selects to an NR cell or if the UE enters RRC_IDLE.

Some embodiments alternatively or additionally comprises one or more of the following network actions. Upon reception of paging request from CN (AMF), the gNB sends a paging request to at least one neighboring E-UTRA/EPC eNB comprising the UE identifier provided by the CN (e.g. 5G-S-TMSI). The CN may indicate: a subset of UEs which should be paged in neighboring E-UTRA/EPC cells (e.g. only UEs which are/were in RRC_INACTIVE); and/or a subset of E-UTRA/EPC cells which should be requested to page the UE. To facilitate this granularity information from the CN, the RAN (gNB) may inform the network of the UE states. This information may also include a list of cells (NR and/or E-UTRA/EPC) which are included in the UE specific RAN notification area. In some embodiments, the interface between EPC and 5GC is enhanced to allow forwarding of CN paging from AMF to MME and thus page the UE in EPC with a 5GC identifier. The E-UTRAN may be upgraded to support connectivity to the AMF in 5GC, without support of connection to UPF, i.e. the eNB would still be considered to be connected to EPC, but would be able to receive paging requests from 5GC. Alternatively or additionally, the network provides the UE with a timer to be used upon reselecting an E-UTRA/EPC cell in the RAN Notification Area.

Generally, then, according to some embodiments, a UE is configured with a RAN Notification Area comprising both NR and E-UTRA/EPC cells while in RRC_INACTIVE. If the source gNB loses the UE context, the CN according to some embodiments is still able to reach the UE even in the E-UTRA/EPC cells.

One UE aspect is for the UE to monitor paging in an E-UTRA/EPC cell for a 5GC identifier (e.g. 5G-S-TMSI).

In an alternative UE embodiment, the UE can only remain in an E-UTRA/EPC cell for a short period of time before registering in EPC and thus reducing the duration of non-reachability.

One network aspect is how to send a paging request to the eNB with the CN UE identifier, when the source gNB has lost the UE context, and thus the information of which E-UTRA/EPC cells the UE may camp in.

The network can either forward the page to the eNB via inter-node messages (X2), via N26, or via N2, but the eNB remain connected to EPC.

Certain network signaling can be introduced to reduce narrow down which cells to page the UE in.

Certain embodiments may provide one or more of the following technical advantage(s). One advantage is that a UE configured with both NR and E-UTRA/EPC cells in NR RRC_INACTIVE can remain reachable, even if the source gNB loses the UE Inactive AS context, e.g. due to failure. Without embodiments herein, a UE camping on an E-UTRA/EPC cell in NR RRC_INACTIVE would not be possible to page using CN 5G-S-TMSI identifier and would be unreachable until the periodic RAN Area Update time expired or the UE attempted to resume the connection.

Some of the embodiments in FIG. 2 may be exemplified with enhancements of E-UTRA NR Dual Connectivity (EN-DC) X2 to allow inter-system CN paging, where the first network node 30A is a gNB, the first AN 12A is an NR access network, the first CN 14A is a 5G Core (5GC), the second network node 30B is an eNB, the second AN 12B is a E-UTRA access network, the second CN 14B is an Evolved Packet Core (EPC), and the wireless device 16 is a user equipment UE).

In one such embodiment, the inter-node signaling is enhanced to support also RAN paging with the 5G-S-TMSI CN identifier. Since it is assumed that the source gNB has experienced a failure and unexpectedly lost the UE Inactive AS context, the source gNB does not know which eNBs to page the UE in.

In one sub-embodiment, the gNB forwards any CN page to all neighbor eNBs. If there is no X2 connection between the eNB and the gNB, the X2 connection is established based on e.g. automatic neighbor relations. This solution is the least complex but will result in significant additional signaling as any NR RRC_IDLE UE would be paged also in any neighboring E-UTRA/EPC cell.

In another sub-embodiment, the AMF requests the gNB to report all UE RRC transitions. Thus, when a UE is suspended to RRC_INACTIVE, the AMF would know this. If the UE is then configured with both NR and E-UTRA/EPC cells and is camping on an E-UTRA/EPC cell when the CN pages the UE, the CN can indicate to the gNB that the UE was in RRC_INACTIVE. The gNB would then forward the RAN page for only the UEs previously in RRC_INACTIVE in all neighboring E-UTRA/EPC cells. This would reduce the paging load compared to paging for all RRC_IDLE UEs in neighboring E-UTRA/EPC cells.

In another sub-embodiment, the gNB informs the AMF of which cells are included in the UEs RAN Notification Area and the AMF requests the gNB to inform the AMF of the UE state transitions. If the gNB loses the UE Inactive AS Context, the AMF can page the UE in both the Tracking Area Identifier (TAI) and in the source gNB, the CN indicates which neighboring cells should also be paged.

In a sub-sub embodiment, this list of cells which the gNB informs the AMF of comprise E-UTRA/EPC and/or NR cells.

To support this solution, the following improvements to the 3GPP standards specification may to be included.

First, the X2AP (TS 36.423 v 15.4.0) signaling may be extended to include a CN identifier (e.g. 5G-S-TMSI) or RAN paging. The extension below is based on the XnAP RAN paging as defined in TS 38.423 v 15.4.0. The addition is including e.g. the CN identity 5G-S-TMSI in the RAN paging message.

9.1.1.7 RAN Paging

This message is sent by the NG-RAN node to eNB to page a UE.

Direction: NG-RAN node→eNB.

| IE/Group Name | Presence | IE type and reference | Semantics description | Criticality | Assigned Criticality |
|---|---|---|---|---|---|
| Message Type | M | 9.2.3.1 | | YES | reject |
| CHOICE UE Identity Index Value | M | | | YES | reject |
| >Length-10 | | | | | |
| >>Index Length-10 | M | BIT STRING (SIZE(10)) | Coded as specified in TS 38.304 [33] and TS 36.304 [34]. | — | |
| UE RAN Paging Identity | M | 9.2.3.43 | | YES | ignore |
| Paging DRX | M | 9.2.3.66 | | YES | ignore |
| RAN Paging Area | M | 9.2.3.38 | | YES | reject |
| Paging Priority | O | 9.2.3.44 | | YES | ignore |
| Assistance Data for Paging | O | 9.2.3.41 | | YES | ignore |

9.2.3.43 UE RAN Paging Identity

The IE defines the UE Identity for RAN paging a UE in RRC_INACTIVE.

| IE/Group Name | Presence | Range | IE type and reference | Semantics description |
|---|---|---|---|---|
| CHOICE UE RAN Paging Identity | M | | | |
| >I-RNTI full | | | | |
| >>I-RNTI full | M | | BIT STRING (SIZE (40)) | |
| >NG-5G-S-TMSI | | | | |
| >>NG-5G-S-TMSI | M | | BIT STRING (SIZE (40)) | |

```
UERANPagingIdentity ::=    CHOICE {
  i-RNTI-full                    BIT STRING ( SIZE (40)),
  choice-extension              ProtocolIE-Single-Container { {UERANPagingIdentity-
ExtIEs}}
}
UERANPagingIdentity-ExtIEs XNAP-PROTOCOL-IES ::= {
  ...,
  ng-5G-S-TMSI                   BIT STRING ( SIZE (40))
}
```

Second, E-UTRA RRC (TS 36.331) signaling may be extended to allow a UE to receive a CN identifier (e.g. 5G-S-TSMI) in paging when in NR RRC_INACTIVE and to trigger a transition to RRC_IDLE.

The paging message in E-UTRA was extended in Rel-15 to include the 5G identifiers I-RNTI for RAN paging and 5G-S-TMSI for CN paging Paging Message

```
-- ASN1START
Paging ::=                    SEQUENCE {
  pagingRecordList              PagingRecordList
                          OPTIONAL,    -- Need ON
<< skipped parts>>
}
<< skipped parts>>
PagingRecordList ::=        SEQUENCE (SIZE (1..maxPageRec)) OF PagingRecord
PagingRecord ::=          SEQUENCE {
  ue-Identity                 PagingUE-Identity,
  cn-Domain                   ENUMERATED              {ps, cs},
  ...
}
PagingUE-Identity ::=         CHOICE {
  s-TMSI                        S-TMSI,
  imsi                          IMSI,
  ...,
  ng-5G-S-TMSI-r15              NG-5G-S-TMSI-r15,
  fullI-RNTI-r15                I-RNTI-r15
}
```

However, currently in E-UTRA, these identifiers are only applicable in case E-UTRA is connected to 5GC. With some embodiments, these fields would also be possible to use in an eNB connected to EPC.

The UE procedures could be updated to e.g.:

5.3.2.3 Reception of the Paging message by the UE

Upon receiving the Paging message, the UE shall:

1> if in RRC_IDLE, for each of the PagingRecord, if any, included in the Paging message:
  2> if the ue-Identity included in the PagingRecord matches one of the UE identities allocated by upper layers:
    3> forward the ue-Identity, accessType (if present) and, except for NB-IoT, the cn-Domain to the upper layers;
1> if in RRC_INACTIVE, for each of the PagingRecord, if any, included in the Paging message:
  2> if the UE is camping on an E-UTRA/EPC cell:
    3> if the ue-Identity included in the PagingRecord matches the stored full I-RNTI; or
    3> if the ue-Identity included in the PagingRecord matches one of the UE identities allocated by upper layers:
      4> forward the ue-Identity, accessType (if present) and the cn-Domain to the upper layers;
      4> perform the actions upon leaving RRC_INACTIVE as specified in 5.3.12, with release cause 'other';
  2> else:
    3> if the ue-Identity included in the PagingRecord matches the stored full I-RNTI:
      4> if UE is configured with one or more access identities equal to 1, 2 or 11-15 applicable in the selected PLMN:
        5> initiate RRC connection resume procedure in 5.3.3.2 with cause value set to 'highPrority-Access';
      4> else:
        5> initiate the RRC connection resumption procedure according to 5.3.3.2 with cause value set to 'mt-access';
    3> else if the ue-Identity included in the PagingRecord matches one of the UE identities allocated by upper layers:
      4> forward the ue-Identity, access Type (if present) and the cn-Domain to the upper layers;
      4> perform the actions upon leaving RRC_INACTIVE as specified in 5.3.12, with release cause 'other';

Third, N2 signalling may be extended for a gNB to inform an AMF of which cells (NR and/or E-UTRA) are included in the RAN Notification Area.

The current N2 UE notification only considers when a UE performs a state transition. This message could be extended to also include a list of the RAN Notification cells (or RAN area codes) comprising E-UTRA/EPC and/or NR cells. Alternatively, a new N2 message is introduced for this purpose.

Other embodiments in FIG. 2 may be exemplified with enhancements of the N26 interface between the AMF and MME to allow inter-system paging, where the first network node 30A is an AMF, the first AN 12A is an NR access network, the first CN 14A is a 5G Core (5GC), the second network node 30B is an MME, the second CN 14B is an Evolved Packet Core (EPC), and the wireless device 16 is a user equipment UE). In this regard, an interface between the 5GC AMF and the EPC MME controls the UE mobility management in 5GS and EPS respectively. This interface allows context relocation between the systems at e.g. handover. The interface in some embodiments is enhanced to allow extension of the allowed Tracking Areas of a UE to comprise both NR and E-UTRA/EPC cells. If the UE is suspended to RRC_INACTIVE with an RAN notification area comprising both NR and E-UTRA/EPC cells, when the 5GC need to page the UE (e.g. at gNB failure), the AMF may send a page request to the EPS MME. This request would contain a UE identifier and the tracking areas to be paged in. The message may also contain a list of which cells the UE is configured with in the RAN Notification Area, if the AMF has that information.

When the MME receives the page request from the AMF, the MME can page the UE in the relevant cells with the identifier it received from the AMF. Alternatively, the MME can derive or identify an EPC identifier associated with the UE which may be a mapped identifier. In either case, the UE need to monitor the paging channels in the E-UTRA/EPC cells for the relevant identifier.

Still other embodiments in FIG. 2 may be exemplified where E-UTRA/EPC eNBs are connected to 5GC only to receive paging from the AMF, where the first network node 30A is an AMF, the first CN 14A is a 5G Core (5GC), the second network node 30B is an eNB, the second AN 12B is E-UTRA, the second CN 14B is an Evolved Packet Core (EPC), and the wireless device 16 is a user equipment UE). In this embodiment, the E-UTRA/EPC eNBs are updated to be connected only to the AMF in 5GC (i.e. not to the UPF). In this case, the eNB would only be able to receive the paging from the AMF with e.g. the 5G-S-TMSI or I-RNTI. This could for instance be an eNB which is connected to both EPC and 5GC, where the EPC cells also support paging with 5GC identifiers.

Embodiments in FIG. 10 may be exemplified by introducing a new (second) RNA-update timer. This timer starts when a UE re-selects to an E-UTRA/EPC cell in the RNA while in RRC_INACTIVE. If the UE re-selects to an NR cell, the timer stops. If the timer expires, the UE goes to RRC_IDLE.

More particularly, in another embodiment, the UE behavior is modified so that if there is an error in a gNB, the UE only remains in E-UTRA for a short period of time during which it is unreachable.

To do this, a new timer is introduced in e.g. broadcasted signaling (SIBs) or dedicated signaling (in e.g. SuspendConfig in RRCRelease). The message could be extended to e.g.:

RRCRelease Message

```
-- ASN1START
-- TAG-RRCRELEASE-START
RRCRelease ::=                          SEQUENCE {
   rrc-TransactionIdentifier                    RRC-TransactionIdentifier,
   critical Extensions                      CHOICE {
      rrcRelease                                RRCRelease-IEs,
      criticalExtensionsFuture                     SEQUENCE { }
   }
}
<<skipped parts>>
SuspendConfig ::=                         SEQUENCE {
   fullI-RNTI                          I-RNTI-Value,
   shortI-RNTI                             ShortI-RNTI-Value,
   ran-PagingCycle                             PagingCycle,
   ran-NotificationAreaInfo                    RAN-NotificationAreaInfo    OPTIONAL,   -- Need M
   t380                               PeriodicRNAU-TimerValue          OPTIONAL,   -- Need R
   nextHopChainingCount                            NextHopChainingCount,
   ...,
   [[t3xx                           PeriodicRNAU-TimerValueEPC          OPTIONAL,   -- Need R
   ]]
}
PeriodicRNAU-TimerValue ::=                    ENUMERATED { min5, min10, min20, min30,
min60, min120, min360, min720}
PeriodicRNAU-TimerValueEPC ::=                   ENUMERATED { s1, s10, s20, s30, min1,
min5, min10, min15}
<< skipped parts>>
-- TAG-RRCRELEASE-STOP
-- ASN1STOP
```

| t380 |
|---|
| Refers to the timer that triggers the periodic RNAU procedure in UE. Value min5 corresponds to 5 minutes, value min10 corresponds to 10 minutes and so on. |
| ran-3xx |
| Refers to the UE specific cycle for RAN-initiated paging in E-UTRA/EPC cells. Value s1 corresponds to 1 second, s10 corresponds to 10 seconds and so on. min1 corresponds to 1 minute, min5 corresponds to 5 minutes and so on. |

The time values for the new timer are only shown as an example. Any other time values are equally applicable, and the number of values could be either more, less or the same as the existing PeriodicRNAU-TimerValue IE.

The procedures would be updated in TS 38.331 to e.g.:

5.3.13.12 Inter RAT Cell Reselection

Upon reselecting to an inter-RAT cell, the UE shall:

1> if the reselected cell is an E-UTRA cell included in the configured RAN Notification Area:

2> start timer Txxx with value PeriodicRNAU-TimerValueEPC;

1> else if the reselected cell is an NR cell:

2> stop timer txxx;

1> else perform the actions upon going to RRC_IDLE as specified in 5.3.11, with release cause 'other'.

5.3.13.x Txxx expiry

The UE shall:

1> if timer Txxx expires:

2> perform the actions upon going to RRC_IDLE as specified in 5.3.11 with release cause 'other'.

In some embodiments, in LTE the UE is said to be camping in a cell when it is ready to access the cell, i.e. it has acquired the cell's system information and knows how to send a preamble to the random access channel (RACH). The UE camps in a LTE cell in what is called the RRC IDLE state, which in LTE is the main sleeping state optimized for battery savings. In such a state, mobility is performed by UE via cell reselection and the UE is not known at the RAN level but only at the core network level in what is called a Tracking Area or Tracking Area list composed by a set of LTE cells. This is needed in the case the network needs to contact the UE, e.g. via paging. As such, in the worst case, the CN needs to send a paging command to the cells belonging to the Tracking Area list that the UE has been configured with. As the UE moves around the network it needs to inform the core network, more specifically the MME, via NAS signaling in the case it has changed its Tracking Area to a Tracking Area not in the Tracking Area list so that the network can still page the UE. Similar but slightly different concepts are also used in 2G (GSM/GPRS), 3G (WCDMA/UMTS. CDMA2000, CDMA EV-DO) systems.

Traditionally, a terminal device (UE) in a sleep state, e.g. idle mode/inactive state/suspended state, camps in one cell within one RAT, e.g. GSM, UMTS, or LTE. By "camp" or "camping", it is meant that the UE monitors a set of downlink control channels. For LTE, this means that the UE is monitoring the PCI and reference signals which are ceil specific and reads the system information when appropriate. In addition, the UE in LTE monitors the PDCCH to check for pages at its specific paging occasions. The UE has therefore acquired the system information and is ready to access the cell.

Hence, in the context of the present description the term "camping area" (CA) is defined as a general term for the kind and/or size of an area (such as an area being related to a cell, a coverage area that relies on beamforming, a tracking area, a set of beams represented by beam identifiers, and the like), and can be used to build up a definition of an area in which a UE is allowed to move around without informing the network of its whereabouts. In LTE a CA is realized as a Tracking Area. With this term, the procedure of reporting the UE's location to the network is generally referred to as "Camping Area Update" or "CA Update" or "CAU". The network indicates presence of a CA by broadcasting the CA's CA Identifier (CAI) (e.g. the Tracking Area Identifier (TAI) in LTE). In NR, with respect to RRC Inactive state, a CA may be realized as a RAN notification area (RNA).

More particularly in this regard, a new RRC state in NR complements the existing states, RRC_IDLE and RRC_CONNECTED. The new state is referred to as RRC_INACTIVE and allows a UE to benefit from several aspects of the two original states. Similar to RRC_IDLE, the UE performs cell-reselection based on measurements of reference signals without providing the network with measurement reports. Additionally, when the network needs to reach the UE, e.g. when DL traffic has arrived, the network pages the UE which in turn performs a random access (RA) to connect to the network. Likewise, when the UE needs to initiate UL traffic, it performs a RA to the current cell to synchronize and connect to the network. What differs for RRC_INACTIVE compared to RRC_IDLE is that the UE and gNB maintains configurations obtained in RRC_CONNECTED related to e.g. AS context, security, and radio bearers so that after the RA, the UE can resume its old configurations without much delay. In addition, the gNB can maintain the CN/RAN interface (NG-C and NGU), further reducing the resumption latency. Since the UE resumption from RRC_INACTIVE to RRC_CONNECTED assumes that the old UE context can be reused, whichever cell the UE has re-selected must be able to retrieve the context from the old cell. If the context fetch fails, the network can instruct the UE to perform a RRC Connection Setup similar to the one performed from RRC_IDLE.

Since the RAN/CN connection can be maintained in RRC_INACTIVE, the CN will assume that the UE is in ECM_CONNECTED. Whenever the network needs to reach the UE, e.g. when there is DL data available, the network will need to page the UE, as the RRC connection is suspended. However, as the CN assumes that the UE is in connected mode, the CN cannot initiate the page, but rather the RAN will have to initiate the notification. To facilitate a more efficient paging scheme, the RAN can assign a limited area (called a RAN notification area), covering one or more cells, within which the UE can be paged by the RAN; this limited area may be referred to as a camping area in this context. While the UE moves within this RAN notification area it does not need to notify the network of its location. It is only when the UE moves outside the RAN notification area that it will have to signal the network of its new location and be assigned a modified RAN notification area. As the RAN notification area can be smaller than the CN Tracking Area, the RAN paging message can be sent out in a smaller number of cells than a typical CN paging. In some embodiments, a UE in the RRC_INACTIVE state can be configured by the last serving NG-RAN node with an RNA, where the RNA can cover a single or multiple cells, and shall be contained within the CN registration area. A RAN-based notification area update (RNAU) is periodically sent by the UE and is also sent when the cell reselection procedure of the UE selects a cell that does not belong to the configured RNA. There are several different alternatives on how the RNA can be configured. One alternative is a list of cells: A UE is provided an explicit list of cells (one or more) that constitute the RNA. Another alternative is a list of RAN areas: A UE is provided (at least one) RAN area ID, where a RAN area is a subset of a CN Tracking Area or equal to a CN Tracking Area. A RAN area is specified by one RAN area ID, which consists of a TAI and optionally a RAN area Code. A cell broadcasts a RAN area ID in the system information.

RRC_INACTIVE is a state where a UE remains in CM-CONNECTED and can move within an area configured by NG-RAN (the RNA) without notifying NG-RAN. In RRC_INACTIVE, the last serving gNB node keeps the UE context and the UE-associated NG connection with the serving AMF and UPF. If the last serving gNB receives DL data from the UPF or DL signalling from the AMF (except the UE Release Command and Reset messages) while the UE is in RRC_INACTIVE, it pages in the cells corresponding to the RNA and may send XnAP RAN Paging to neighbour gNB(s) if the RNA includes cells of neighbour gNB(s).

In some embodiments, with cell selection, the UE searches for a suitable cell of the selected PLMN, chooses that cell to provide available services, and monitors its control channel. This procedure is defined as "camping on the cell". The UE shall, if necessary, then register its presence, by means of a NAS registration procedure, in the tracking area of the chosen cell. As an outcome of a successful Location Registration, the selected PLMN then becomes the registered PLMN.

Note that some embodiments herein discuss solutions for UEs in RRC_INACTIVE reselecting to inter-RAT cells connected to another core network (CN). Although the examples describe re-selections in RRC_INACTIVE between NR and E-UTRA connected to EPC, the solutions are equally applicable for reselection in RRC_INACTIVE from E-UTRA connected to 5GC and E-UTRA connected to EPC, or between E-UTRA connected to 5GC and NR.

Figure 17:
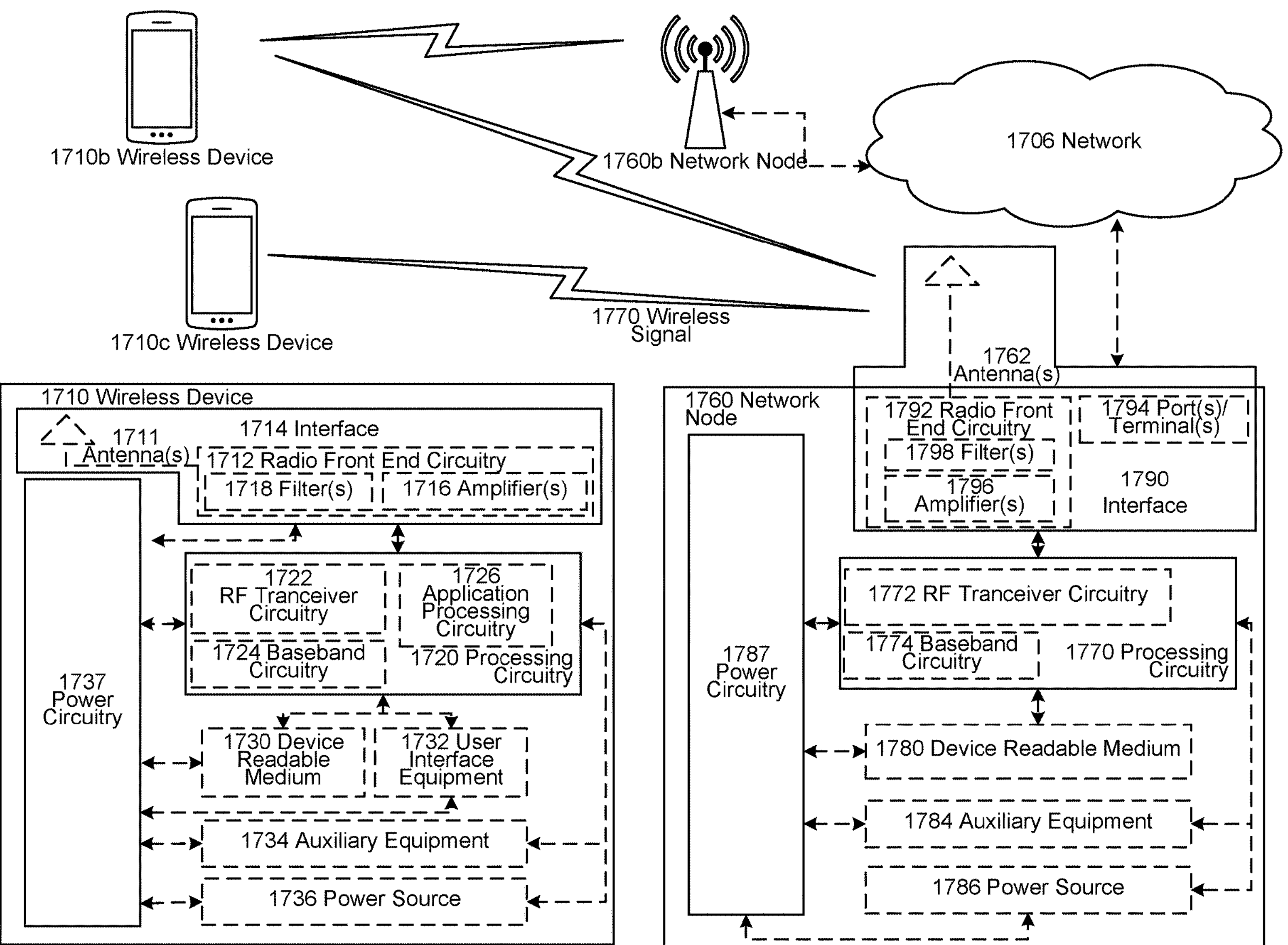
FIG. 17 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network 1706, network nodes 1760 and 1760*b*, and WDs 1710, 1710*b*, and 1710*c*. In practice, a wireless network may further include any additional elements suitable to support communication between wireless devices or between a wireless device and another communication device, such as a landline telephone, a service provider, or any other network node or end device. Of the illustrated components, network node 1760 and wireless device (WD) 1710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1760 and WD 1710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SM LCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node 1760 includes processing circuitry 1770, device readable medium 1780, interface 1790, auxiliary equipment 1784, power source 1786, power circuitry 1787, and antenna 1762. Although network node 1760 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1760 are depicted as single boxes located within a larger box, or nested within multiple boxes, in practice, a network node may comprise multiple different physical components that make up a single illustrated component (e.g., device readable medium 1780 may comprise multiple separate hard drives as well as multiple RAM modules).

Similarly, network node 1760 may be composed of multiple physically separate components (e.g., a NodeB component and a RNC component, or a BTS component and a BSC component, etc.), which may each have their own respective components. In certain scenarios in which network node 1760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1760 may be configured to support multiple radio access technologies (RATs). In such embodiments, some components may be duplicated (e.g., separate device readable medium 1780 for the different RATs) and some components may be reused (e.g., the same antenna 1762 may be shared by the RATs). Network node 1760 may also include multiple sets of the various illustrated components for different wireless technologies integrated into network node 1760, such as, for example, GSM, WCDMA, LTE, NR, WiFi, or Bluetooth wireless technologies. These wireless technologies may be integrated into the same or different chip or set of chips and other components within network node 1760.

Processing circuitry 1770 is configured to perform any determining, calculating, or similar operations (e.g., certain obtaining operations) described herein as being provided by a network node. These operations performed by processing circuitry 1770 may include processing information obtained by processing circuitry 1770 by, for example, converting the obtained information into other information, comparing the obtained information or converted information to information stored in the network node, and/or performing one or more operations based on the obtained information or converted information, and as a result of said processing making a determination.

Processing circuitry 1770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1760 components, such as device readable medium 1780, network node 1760 functionality. For example, processing circuitry 1770 may execute instructions stored in device readable medium 1780 or in memory within processing circuitry 1770. Such functionality may include providing any of the various wireless features, functions, or benefits discussed herein. In some embodiments, processing circuitry 1770 may include a system on a chip (SOC).

In some embodiments, processing circuitry 1770 may include one or more of radio frequency (RF) transceiver circuitry 1772 and baseband processing circuitry 1774. In some embodiments, radio frequency (RF) transceiver circuitry 1772 and baseband processing circuitry 1774 may be on separate chips (or sets of chips), boards, or units, such as radio units and digital units. In alternative embodiments, part or all of RF transceiver circuitry 1772 and baseband processing circuitry 1774 may be on the same chip or set of chips, boards, or units In certain embodiments, some or all of the functionality described herein as being provided by a network node, base station, eNB or other such network device may be performed by processing circuitry 1770 executing instructions stored on device readable medium 1780 or memory within processing circuitry 1770. In alternative embodiments, some or all of the functionality may be provided by processing circuitry 1770 without executing instructions stored on a separate or discrete device readable medium, such as in a hard-wired manner. In any of those embodiments, whether executing instructions stored on a device readable storage medium or not, processing circuitry 1770 can be configured to perform the described functionality. The benefits provided by such functionality are not limited to processing circuitry 1770 alone or to other components of network node 1760, but are enjoyed by network node 1760 as a whole, and/or by end users and the wireless network generally.

Device readable medium 1780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1770. Device readable medium 1780 may store any suitable instructions, data or information, including a computer program, software, an application including one or more of logic, rules, code, tables, etc. and/or other instructions capable of being executed by processing circuitry 1770 and, utilized by network node 1760. Device readable medium 1780 may be used to store any calculations made by processing circuitry 1770 and/or any data received via interface 1790. In some embodiments, processing circuitry 1770 and device readable medium 1780 may be considered to be integrated.

Interface 1790 is used in the wired or wireless communication of signalling and/or data between network node 1760, network 1706, and/or WDs 1710. As illustrated, interface 1790 comprises port(s)/terminal(s) 1794 to send and receive data, for example to and from network 1706 over a wired connection. Interface 1790 also includes radio front end circuitry 1792 that may be coupled to, or in certain embodiments a part of, antenna 1762. Radio front end circuitry 1792 comprises filters 1798 and amplifiers 1796. Radio front end circuitry 1792 may be connected to antenna 1762 and processing circuitry 1770. Radio front end circuitry may be configured to condition signals communicated between antenna 1762 and processing circuitry 1770. Radio front end circuitry 1792 may receive digital data that is to be sent out to other network nodes or WDs via a wireless connection. Radio front end circuitry 1792 may convert the digital data into a radio signal having the appropriate channel and bandwidth parameters using a combination of filters 1798 and/or amplifiers 1796. The radio signal may then be transmitted via antenna 1762. Similarly, when receiving data, antenna 1762 may collect radio signals which are then converted into digital data by radio front end circuitry 1792. The digital data may be passed to processing circuitry 1770. In other embodiments, the interface may comprise different components and/or different combinations of components.

In certain alternative embodiments, network node 1760 may not include separate radio front end circuitry 1792, instead, processing circuitry 1770 may comprise radio front end circuitry and may be connected to antenna 1762 without separate radio front end circuitry 1792. Similarly, in some embodiments, all or some of RF transceiver circuitry 1772 may be considered a part of interface 1790. In still other embodiments, interface 1790 may include one or more ports or terminals 1794, radio front end circuitry 1792, and RF transceiver circuitry 1772, as part of a radio unit (not shown), and interface 1790 may communicate with baseband processing circuitry 1774, which is part of a digital unit (not shown).

Antenna 1762 may include one or more antennas, or antenna arrays, configured to send and/or receive wireless signals. Antenna 1762 may be coupled to radio front end circuitry 1790 and may be any type of antenna capable of transmitting and receiving data and/or signals wirelessly. In some embodiments, antenna 1762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as M IMO. In certain embodiments, antenna 1762 may be separate from network node 1760 and may be connectable to network node 1760 through an interface or port.

Antenna 1762, interface 1790, and/or processing circuitry 1770 may be configured to perform any receiving operations and/or certain obtaining operations described herein as being performed by a network node. Any information, data and/or signals may be received from a wireless device, another network node and/or any other network equipment. Similarly, antenna 1762, interface 1790, and/or processing circuitry 1770 may be configured to perform any transmitting operations described herein as being performed by a network node. Any information, data and/or signals may be transmitted to a wireless device, another network node and/or any other network equipment.

Power circuitry 1787 may comprise, or be coupled to, power management circuitry and is configured to supply the components of network node 1760 with power for performing the functionality described herein. Power circuitry 1787 may receive power from power source 1786. Power source 1786 and/or power circuitry 1787 may be configured to provide power to the various components of network node 1760 in a form suitable for the respective components (e.g., at a voltage and current level needed for each respective component). Power source 1786 may either be included in, or external to, power circuitry 1787 and/or network node 1760. For example, network node 1760 may be connectable to an external power source (e.g., an electricity outlet) via an input circuitry or interface such as an electrical cable, whereby the external power source supplies power to power circuitry 1787. As a further example, power source 1786 may comprise a source of power in the form of a battery or battery pack which is connected to, or integrated in, power circuitry 1787. The battery may provide backup power should the external power source fail. Other types of power sources, such as photovoltaic devices, may also be used.

Alternative embodiments of network node 1760 may include additional components beyond those shown in FIG. 17 that may be responsible for providing certain aspects of the network node's functionality, including any of the functionality described herein and/or any functionality necessary to support the subject matter described herein. For example, network node 1760 may include user interface equipment to allow input of information into network node 1760 and to allow output of information from network node 1760. This may allow a user to perform diagnostic, maintenance, repair, and other administrative functions for network node 1760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1710 includes antenna 1711, interface 1714, processing circuitry 1720, device readable medium 1730, user interface equipment 1732, auxiliary equipment 1734, power source 1736 and power circuitry 1737. WD 1710 may include multiple sets of one or more of the illustrated components for different wireless technologies supported by WD 1710, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1710.

Antenna 1711 may include one or more antennas or antenna arrays, configured to send and/or receive wireless signals, and is connected to interface 1714. In certain alternative embodiments, antenna 1711 may be separate from WD 1710 and be connectable to WD 1710 through an interface or port. Antenna 1711, interface 1714, and/or processing circuitry 1720 may be configured to perform any receiving or transmitting operations described herein as being performed by a WD. Any information, data and/or signals may be received from a network node and/or another WD. In some embodiments, radio front end circuitry and/or antenna 1711 may be considered an interface.

As illustrated, interface 1714 comprises radio front end circuitry 1712 and antenna 1711. Radio front end circuitry 1712 comprise one or more filters 1718 and amplifiers 1716. Radio front end circuitry 1714 is connected to antenna 1711 and processing circuitry 1720, and is configured to condition signals communicated between antenna 1711 and processing circuitry 1720. Radio front end circuitry 1712 may be coupled to or a part of antenna 1711. In some embodiments, WD 1710 may not include separate radio front end circuitry 1712; rather, processing circuitry 1720 may comprise radio front end circuitry and may be connected to antenna 1711. Similarly, in some embodiments, some or all of RF transceiver circuitry 1722 may be considered a part of interface 1714. Radio front end circuitry 1712 may receive digital data that is to be sent out to other network nodes or WDs via a wireless connection. Radio front end circuitry 1712 may convert the digital data into a radio signal having the appropriate channel and bandwidth parameters using a combination of filters 1718 and/or amplifiers 1716. The radio signal may then be transmitted via antenna 1711. Similarly, when receiving data, antenna 1711 may collect radio signals which are then converted into digital data by radio front end circuitry 1712. The digital data may be passed to processing circuitry 1720. In other embodiments, the interface may comprise different components and/or different combinations of components.

Processing circuitry 1720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1710 components, such as device readable medium 1730, WD 1710 functionality. Such functionality may include providing any of the various wireless features or benefits discussed herein. For example, processing circuitry 1720 may execute instructions stored in device readable medium 1730 or in memory within processing circuitry 1720 to provide the functionality disclosed herein.

As illustrated, processing circuitry 1720 includes one or more of RF transceiver circuitry 1722, baseband processing circuitry 1724, and application processing circuitry 1726. In other embodiments, the processing circuitry may comprise different components and/or different combinations of components. In certain embodiments processing circuitry 1720 of WD 1710 may comprise a SOC. In some embodiments, RF transceiver circuitry 1722, baseband processing circuitry 1724, and application processing circuitry 1726 may be on separate chips or sets of chips. In alternative embodiments, part or all of baseband processing circuitry 1724 and application processing circuitry 1726 may be combined into one chip or set of chips, and RF transceiver circuitry 1722 may be on a separate chip or set of chips. In still alternative embodiments, part or all of RF transceiver circuitry 1722 and baseband processing circuitry 1724 may be on the same chip or set of chips, and application processing circuitry 1726 may be on a separate chip or set of chips. In yet other alternative embodiments, part or all of RF transceiver circuitry 1722, baseband processing circuitry 1724, and application processing circuitry 1726 may be combined in the same chip or set of chips. In some embodiments, RF transceiver circuitry 1722 may be a part of interface 1714. RF transceiver circuitry 1722 may condition RF signals for processing circuitry 1720.

In certain embodiments, some or all of the functionality described herein as being performed by a WD may be provided by processing circuitry 1720 executing instructions stored on device readable medium 1730, which in certain embodiments may be a computer-readable storage medium. In alternative embodiments, some or all of the functionality may be provided by processing circuitry 1720 without executing instructions stored on a separate or discrete device readable storage medium, such as in a hard-wired manner. In any of those particular embodiments, whether executing instructions stored on a device readable storage medium or not, processing circuitry 1720 can be configured to perform the described functionality. The benefits provided by such functionality are not limited to processing circuitry 1720 alone or to other components of WD 1710, but are enjoyed by WD 1710 as a whole, and/or by end users and the wireless network generally.

Processing circuitry 1720 may be configured to perform any determining, calculating, or similar operations (e.g., certain obtaining operations) described herein as being performed by a WD. These operations, as performed by processing circuitry 1720, may include processing information obtained by processing circuitry 1720 by, for example, converting the obtained information into other information, comparing the obtained information or converted information to information stored by WD 1710, and/or performing one or more operations based on the obtained information or converted information, and as a result of said processing making a determination.

Device readable medium 1730 may be operable to store a computer program, software, an application including one or more of logic, rules, code, tables, etc. and/or other instructions capable of being executed by processing circuitry 1720. Device readable medium 1730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1720. In some embodiments, processing circuitry 1720 and device readable medium 1730 may be considered to be integrated.

User interface equipment 1732 may provide components that allow for a human user to interact with WD 1710. Such interaction may be of many forms, such as visual, audial, tactile, etc. User interface equipment 1732 may be operable to produce output to the user and to allow the user to provide input to WD 1710. The type of interaction may vary depending on the type of user interface equipment 1732 installed in WD 1710. For example, if WD 1710 is a smart phone, the interaction may be via a touch screen; if WD 1710 is a smart meter, the interaction may be through a screen that provides usage (e.g., the number of gallons used) or a speaker that provides an audible alert (e.g., if smoke is detected). User interface equipment 1732 may include input interfaces, devices and circuits, and output interfaces, devices and circuits. User interface equipment 1732 is configured to allow input of information into WD 1710, and is connected to processing circuitry 1720 to allow processing circuitry 1720 to process the input information. User interface equipment 1732 may include, for example, a microphone, a proximity or other sensor, keys/buttons, a touch display, one or more cameras, a USB port, or other input circuitry. User interface equipment 1732 is also configured to allow output of information from WD 1710, and to allow processing circuitry 1720 to output information from WD 1710. User interface equipment 1732 may include, for example, a speaker, a display, vibrating circuitry, a USB port, a headphone interface, or other output circuitry. Using one or more input and output interfaces, devices, and circuits, of user interface equipment 1732, WD 1710 may communicate with end users and/or the wireless network, and allow them to benefit from the functionality described herein.

Auxiliary equipment 1734 is operable to provide more specific functionality which may not be generally performed by WDs. This may comprise specialized sensors for doing measurements for various purposes, interfaces for additional types of communication such as wired communications etc. The inclusion and type of components of auxiliary equipment 1734 may vary depending on the embodiment and/or scenario.

Power source 1736 may, in some embodiments, be in the form of a battery or battery pack. Other types of power sources, such as an external power source (e.g., an electricity outlet), photovoltaic devices or power cells, may also be used. WD 1710 may further comprise power circuitry 1737 for delivering power from power source 1736 to the various parts of WD 1710 which need power from power source 1736 to carry out any functionality described or indicated herein. Power circuitry 1737 may in certain embodiments comprise power management circuitry. Power circuitry 1737 may additionally or alternatively be operable to receive power from an external power source; in which case WD 1710 may be connectable to the external power source (such as an electricity outlet) via input circuitry or an interface such as an electrical power cable. Power circuitry 1737 may also in certain embodiments be operable to deliver power from an external power source to power source 1736. This may be, for example, for the charging of power source 1736. Power circuitry 1737 may perform any formatting, converting, or other modification to the power from power source 1736 to make the power suitable for the respective components of WD 1710 to which power is supplied.

Figure 18:
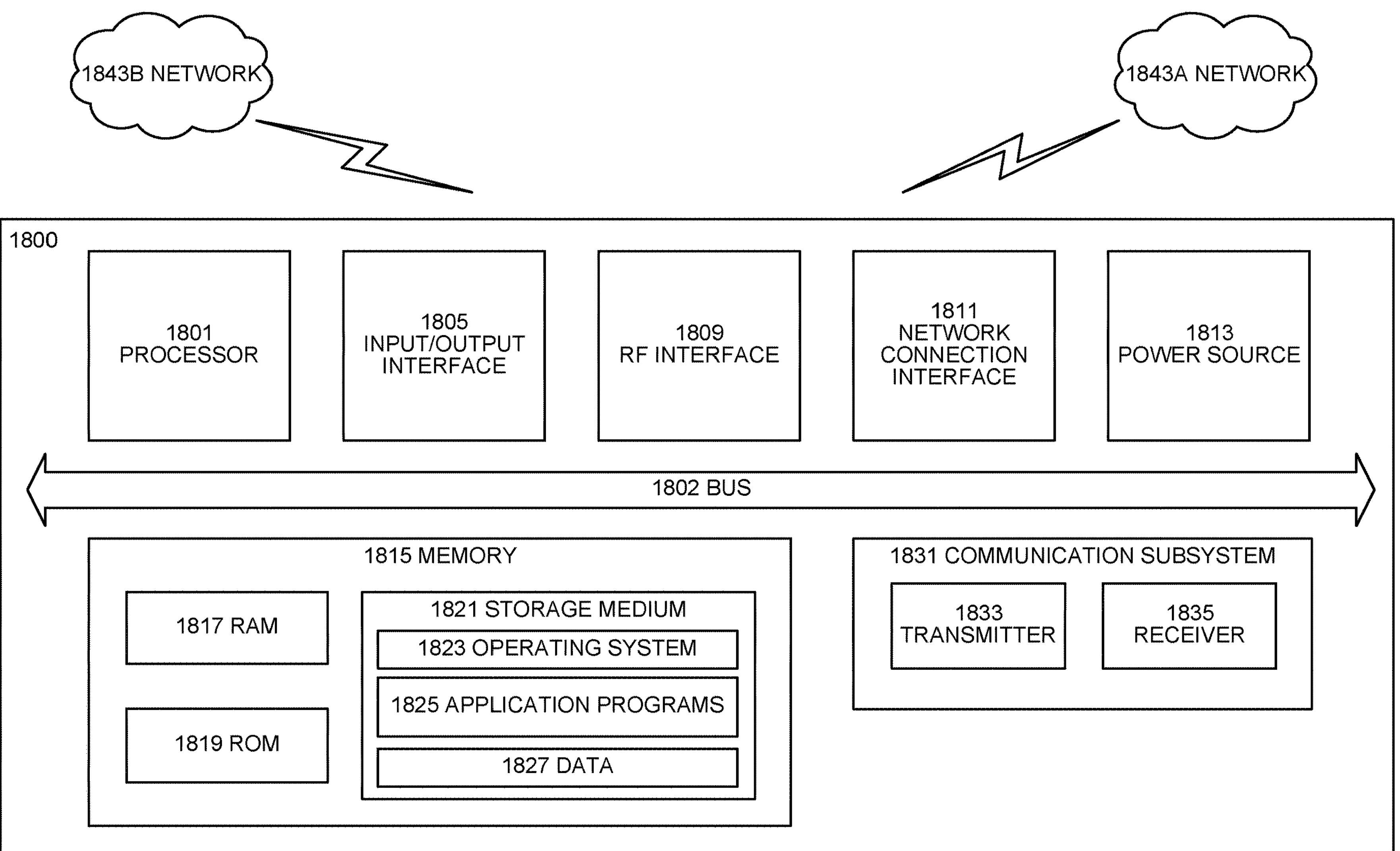
FIG. 18 is a block diagram of a user equipment according to some embodiments.

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 18200 may be any UE identified by the 3$^{rd}$ Generation Partnership Project (3GPP), including a NB-IoT UE, a machine type communication (MTC) UE, and/or an enhanced MTC (eMTC) UE. UE 1800, as illustrated in FIG. 18, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE 1800 includes processing circuitry 1801 that is operatively coupled to input/output interface 1805, radio frequency (RF) interface 1809, network connection interface 1811, memory 1815 including random access memory (RAM) 1817, read-only memory (ROM) 1819, and storage medium 1821 or the like, communication subsystem 1831, power source 1833, and/or any other component, or any combination thereof. Storage medium 1821 includes operating system 1823, application program 1825, and data 1827. In other embodiments, storage medium 1821 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry 1801 may be configured to process computer instructions and data. Processing circuitry 1801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1801 may include two central processing units (CPUs). Data may be information in a form suitable for use by a computer.

In the depicted embodiment, input/output interface 1805 may be configured to provide a communication interface to an input device, output device, or input and output device. UE 1800 may be configured to use an output device via input/output interface 1805. An output device may use the same type of interface port as an input device. For example, a USB port may be used to provide input to and output from UE 1800. The output device may be a speaker, a sound card, a video card, a display, a monitor, a printer, an actuator, an emitter, a smartcard, another output device, or any combination thereof. UE 1800 may be configured to use an input device via input/output interface 1805 to allow a user to capture information into UE 1800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface 1809 may be configured to provide a communication interface to RF components such as a transmitter, a receiver, and an antenna. Network connection interface 1811 may be configured to provide a communication interface to network **1843*a*. Network 1843*a* may encompass wired and/or wireless networks such as a local-area network (LAN), a wide-area network (WAN), a computer network, a wireless network, a telecommunications network, another like network or any combination thereof. For example, network 1843***a* may comprise a Wi-Fi network. Network connection interface 1811 may be configured to include a receiver and a transmitter interface used to communicate with one or more other devices over a communication network according to one or more communication protocols, such as Ethernet, TCP/IP, SONET, ATM, or the like. Network connection interface 1811 may implement receiver and transmitter functionality appropriate to the communication network links (e.g., optical, electrical, and the like). The transmitter and receiver functions may share circuit components, software or firmware, or alternatively may be implemented separately.

RAM 1817 may be configured to interface via bus 1802 to processing circuitry 1801 to provide storage or caching of data or computer instructions during the execution of software programs such as the operating system, application programs, and device drivers. ROM 1819 may be configured to provide computer instructions or data to processing circuitry 1801. For example, ROM 1819 may be configured to store invariant low-level system code or data for basic system functions such as basic input and output (I/O), startup, or reception of keystrokes from a keyboard that are stored in a non-volatile memory. Storage medium 1821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1821 may be configured to include operating system 1823, application program 1825 such as a web browser application, a widget or gadget engine or another application, and data file 1827. Storage medium 1821 may store, for use by UE 1800, any of a variety of various operating systems or combinations of operating systems.

Storage medium 1821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1821 may allow UE 1800 to access computer-executable instructions, application programs or the like, stored on transitory or non-transitory memory media, to off-load data, or to upload data. An article of manufacture, such as one utilizing a communication system may be tangibly embodied in storage medium 1821, which may comprise a device readable medium.

In FIG. 18, processing circuitry 1801 may be configured to communicate with network 1843*b* using communication subsystem 1831. Network 1843*a* and network 1843*b* may be the same network or networks or different network or networks. Communication subsystem 1831 may be configured to include one or more transceivers used to communicate with network 1843*b*. For example, communication subsystem 1831 may be configured to include one or more transceivers used to communicate with one or more remote transceivers of another device capable of wireless communication such as another WD, UE, or base station of a radio access network (RAN) according to one or more communication protocols, such as IEEE 802.18, CDMA, WCDMA, GSM, LTE, UTRAN, WiMax, or the like. Each transceiver may include transmitter 1833 and/or receiver 1835 to implement transmitter or receiver functionality, respectively, appropriate to the RAN links (e.g., frequency allocations and the like). Further, transmitter 1833 and receiver 1835 of each transceiver may share circuit components, software or firmware, or alternatively may be implemented separately.

In the illustrated embodiment, the communication functions of communication subsystem 1831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1831 may include cellular communication, Wi-Fi communication, Bluetooth communication, and GPS communication. Network 1843*b* may encompass wired and/or wireless networks such as a local-area network (LAN), a wide-area network (WAN), a computer network, a wireless network, a telecommunications network, another like network or any combination thereof. For example, network 1843*b* may be a cellular network, a Wi-Fi network, and/or a near-field network. Power source 1813 may be configured to provide alternating current (AC) or direct current (DC) power to components of UE 1800.

The features, benefits and/or functions described herein may be implemented in one of the components of UE 1800 or partitioned across multiple components of UE 1800. Further, the features, benefits, and/or functions described herein may be implemented in any combination of hardware, software or firmware. In one example, communication subsystem 1831 may be configured to include any of the components described herein. Further, processing circuitry 1801 may be configured to communicate with any of such components over bus 1802. In another example, any of such components may be represented by program instructions stored in memory that when executed by processing circuitry 1801 perform the corresponding functions described herein. In another example, the functionality of any of such components may be partitioned between processing circuitry 1801 and communication subsystem 1831. In another example, the non-computationally intensive functions of any of such components may be implemented in software or firmware and the computationally intensive functions may be implemented in hardware.

Figure 19:
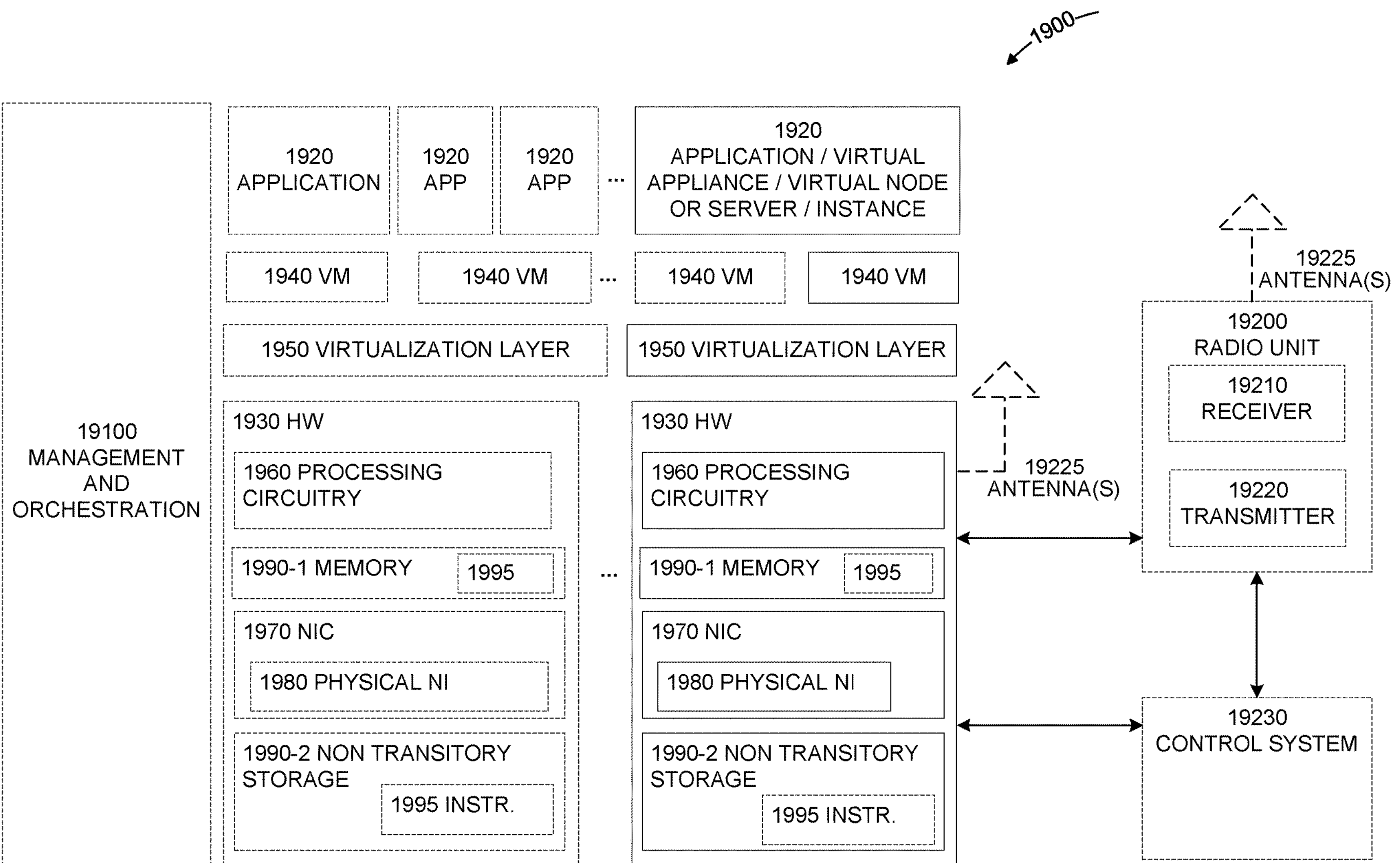
FIG. 19 is a block diagram of a virtualization environment according to some embodiments.

FIG. 19 is a schematic block diagram illustrating a virtualization environment 1900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1900 hosted by one or more of hardware nodes 1930. Further, in embodiments in which the virtual node is not a radio access node or does not require radio connectivity (e.g., a core network node), then the network node may be entirely virtualized.

The functions may be implemented by one or more applications 1920 (which may alternatively be called software instances, virtual appliances, network functions, virtual nodes, virtual network functions, etc.) operative to implement some of the features, functions, and/or benefits of some of the embodiments disclosed herein. Applications 1920 are run in virtualization environment 1900 which provides hardware 1930 comprising processing circuitry 1960 and memory 1990. Memory 1990 contains instructions 1995 executable by processing circuitry 1960 whereby application 1920 is operative to provide one or more of the features, benefits, and/or functions disclosed herein.

Virtualization environment 1900, comprises general-purpose or special-purpose network hardware devices 1930 comprising a set of one or more processors or processing circuitry 1960, which may be commercial off-the-shelf (COTS) processors, dedicated Application Specific Integrated Circuits (ASICs), or any other type of processing circuitry including digital or analog hardware components or special purpose processors. Each hardware device may comprise memory 1990-1 which may be non-persistent memory for temporarily storing instructions 1995 or software executed by processing circuitry 1960. Each hardware device may comprise one or more network interface controllers (NICs) 1970, also known as network interface cards, which include physical network interface 1980. Each hardware device may also include non-transitory, persistent, machine-readable storage media 1990-2 having stored therein software 1995 and/or instructions executable by processing circuitry 1960. Software 1995 may include any type of software including software for instantiating one or more virtualization layers 1950 (also referred to as hypervisors), software to execute virtual machines 1940 as well as software allowing it to execute functions, features and/or benefits described in relation with some embodiments described herein.

Virtual machines 1940, comprise virtual processing, virtual memory, virtual networking or interface and virtual storage, and may be run by a corresponding virtualization layer 1950 or hypervisor. Different embodiments of the instance of virtual appliance 1920 may be implemented on one or more of virtual machines 1940, and the implementations may be made in different ways.

During operation, processing circuitry 1960 executes software 1995 to instantiate the hypervisor or virtualization layer 1950, which may sometimes be referred to as a virtual machine monitor (VMM). Virtualization layer 1950 may present a virtual operating platform that appears like networking hardware to virtual machine 1940.

As shown in FIG. 19, hardware 1930 may be a standalone network node with generic or specific components. Hardware 1930 may comprise antenna 19225 and may implement some functions via virtualization. Alternatively, hardware 1930 may be part of a larger cluster of hardware (e.g. such as in a data center or customer premise equipment (CPE)) where many hardware nodes work together and are managed via management and orchestration (MANO) 19100, which, among others, oversees lifecycle management of applications 1920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1940 may be a software implementation of a physical machine that runs programs as if they were executing on a physical, non-virtualized machine. Each of virtual machines 1940, and that part of hardware 1930 that executes that virtual machine, be it hardware dedicated to that virtual machine and/or hardware shared by that virtual machine with others of the virtual machines 1940, forms a separate virtual network elements (VNE).

Still in the context of NFV, Virtual Network Function (VNF) is responsible for handling specific network functions that run in one or more virtual machines 1940 on top of hardware networking infrastructure 1930 and corresponds to application 1920 in FIG. 19.

In some embodiments, one or more radio units 19200 that each include one or more transmitters 19220 and one or more receivers 19210 may be coupled to one or more antennas 19225. Radio units 19200 may communicate directly with hardware nodes 1930 via one or more appropriate network interfaces and may be used in combination with the virtual components to provide a virtual node with radio capabilities, such as a radio access node or a base station.

In some embodiments, some signalling can be effected with the use of control system 19230 which may alternatively be used for communication between the hardware nodes 1930 and radio units 19200.

Figure 20:
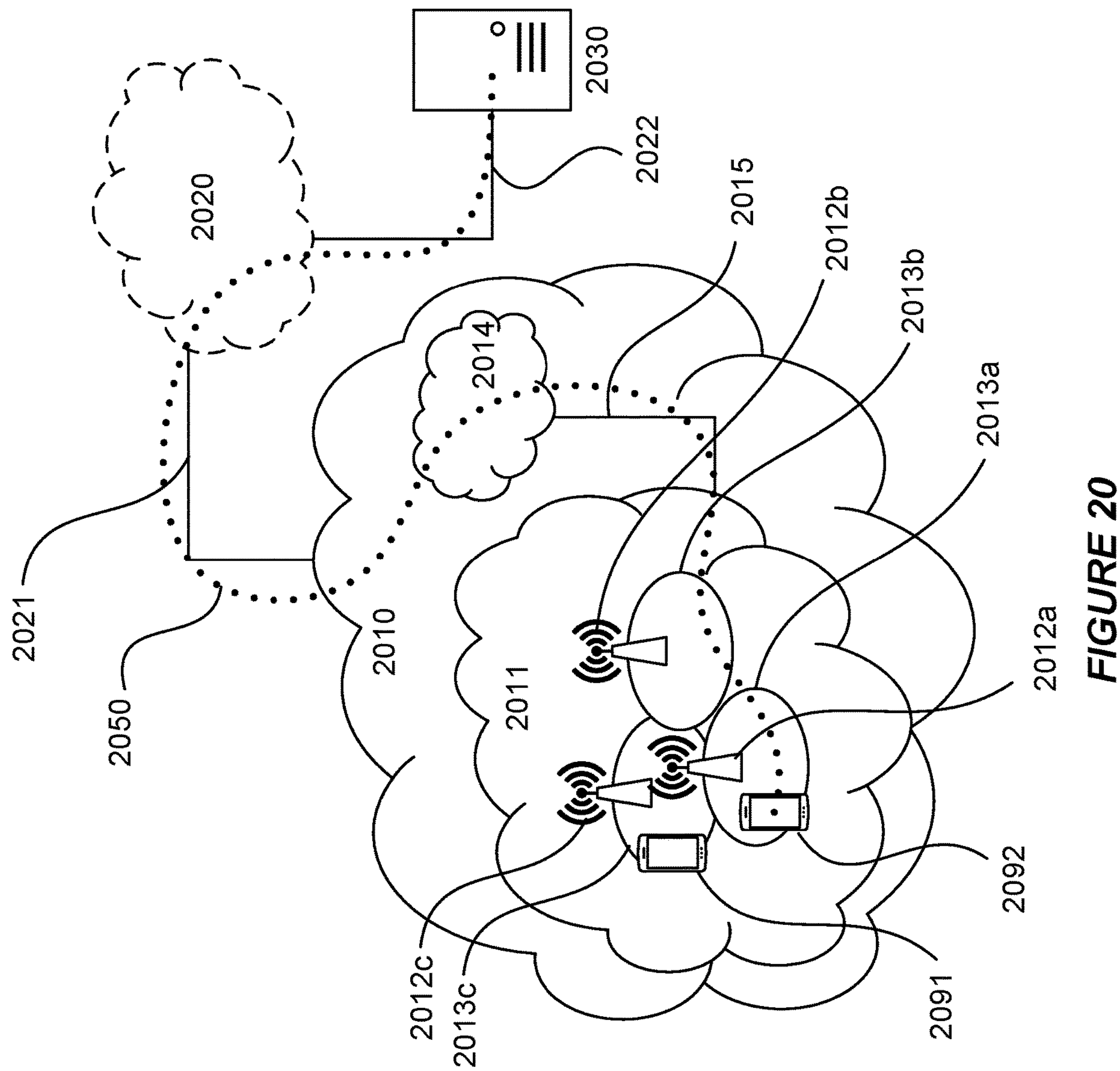
FIG. 20 is a block diagram of a communication network with a host computer according to some embodiments.

FIG. 20 illustrates a telecommunication network connected via an intermediate network to a host computer in accordance with some embodiments. In particular, with reference to FIG. 20, in accordance with an embodiment, a communication system includes telecommunication network 2010, such as a 3GPP-type cellular network, which comprises access network 2011, such as a radio access network, and core network 2014. Access network 2011 comprises a plurality of base stations **2012*a*, 2012*b*, 2012*c*, such as NBs, eNBs, gNBs or other types of wireless access points, each defining a corresponding coverage area 2013*a*, 2013*b*, 2013*c*. Each base station 2012*a*, 2012*b*, 2012*c* is connectable to core network 2014 over a wired or wireless connection 2015. A first UE 2091 located in coverage area 2013*c* is configured to wirelessly connect to, or be paged by, the corresponding base station 2012*c*. A second UE 2092 in coverage area 2013*a* is wirelessly connectable to the corresponding base station 2012*a*. While a plurality of UEs 2091, 2092 are illustrated in this example, the disclosed embodiments are equally applicable to a situation where a sole UE is in the coverage area or where a sole UE is connecting to the corresponding base station 2012**.

Telecommunication network 2010 is itself connected to host computer 2030, which may be embodied in the hardware and/or software of a standalone server, a cloud-implemented server, a distributed server or as processing resources in a server farm. Host computer 2030 may be under the ownership or control of a service provider, or may be operated by the service provider or on behalf of the service provider. Connections 2021 and 2022 between telecommunication network 2010 and host computer 2030 may extend directly from core network 2014 to host computer 2030 or may go via an optional intermediate network 2020. Intermediate network 2020 may be one of, or a combination of more than one of, a public, private or hosted network; intermediate network 2020, if any, may be a backbone network or the Internet; in particular, intermediate network 2020 may comprise two or more sub-networks (not shown).

The communication system of FIG. 20 as a whole enables connectivity between the connected UEs 2091, 2092 and host computer 2030. The connectivity may be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 may be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

Figure 21:
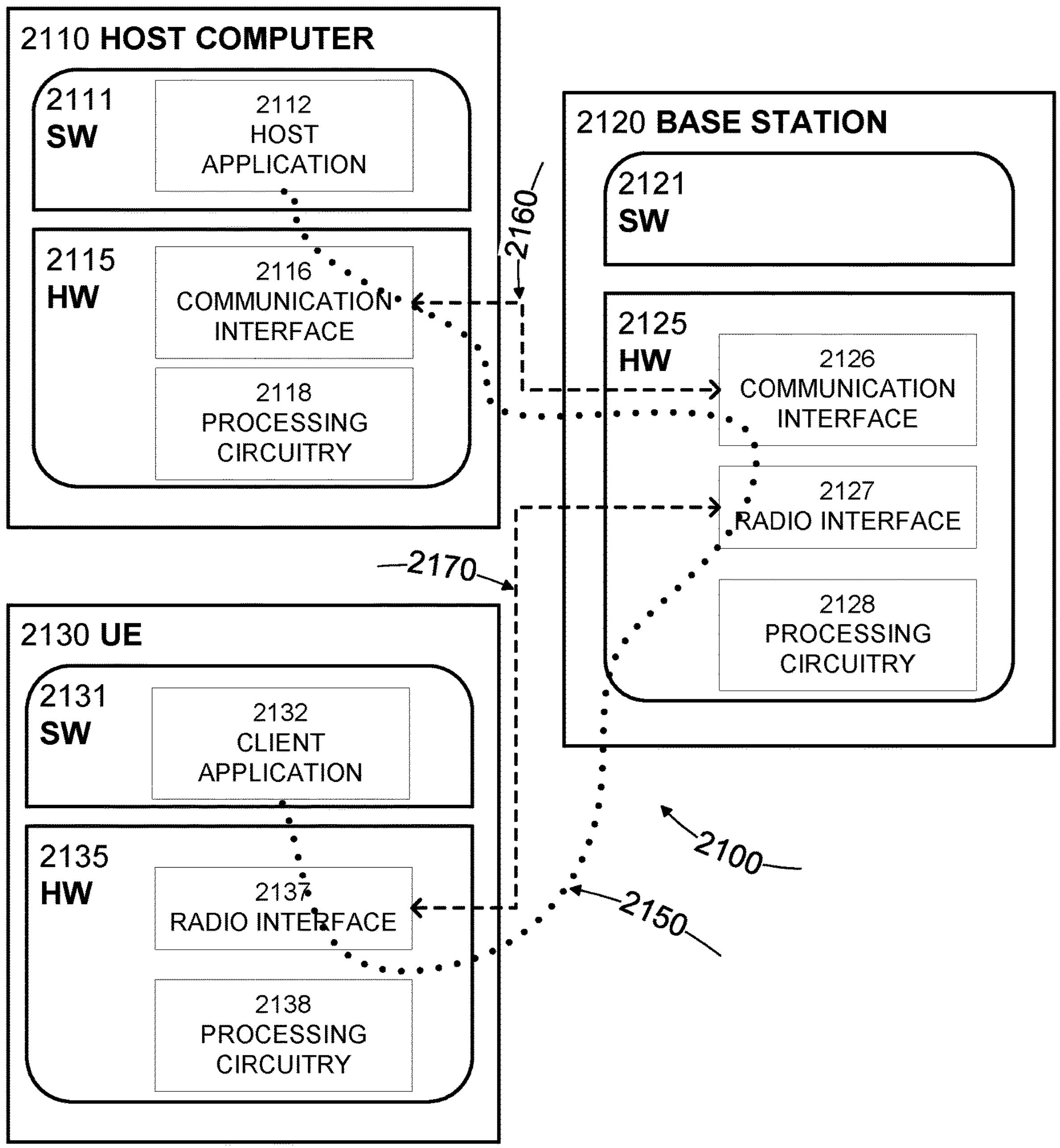
FIG. 21 is a block diagram of a host computer according to some embodiments.

Example implementations, in accordance with an embodiment, of the UE, base station and host computer discussed in the preceding paragraphs will now be described with reference to FIG. 21. FIG. 21 illustrates host computer communicating via a base station with a user equipment over a partially wireless connection in accordance with some embodiments In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which may have storage and/or processing capabilities. In particular, processing circuitry 2118 may comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 may be operable to provide a service to a remote user, such as UE 2130 connecting via OTT connection 2150 terminating at UE 2130 and host computer 2110. In providing the service to the remote user, host application 2112 may provide user data which is transmitted using OTT connection 2150.

Communication system 2100 further includes base station 2120 provided in a telecommunication system and comprising hardware 2125 enabling it to communicate with host computer 2110 and with UE 2130. Hardware 2125 may include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 may be configured to facilitate connection 2160 to host computer 2110. Connection 2160 may be direct or it may pass through a core network (not shown in FIG. 21) of the telecommunication system and/or through one or more intermediate networks outside the telecommunication system. In the embodiment shown, hardware 2125 of base station 2120 further includes processing circuitry 2128, which may comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 further includes UE 2130 already referred to. Its hardware 2135 may include radio interface 2137 configured to set up and maintain wireless connection 2170 with a base station serving a coverage area in which UE 2130 is currently located. Hardware 2135 of UE 2130 further includes processing circuitry 2138, which may comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 may be operable to provide a service to a human or non-human user via UE 2130, with the support of host computer 2110. In host computer 2110, an executing host application 2112 may communicate with the executing client application 2132 via OTT connection 2150 terminating at UE 2130 and host computer 2110. In providing the service to the user, client application 2132 may receive request data from host application 2112 and provide user data in response to the request data. OTT connection 2150 may transfer both the request data and the user data. Client application 2132 may interact with the user to generate the user data that it provides.

It is noted that host computer 2110, base station 2120 and UE 2130 illustrated in FIG. 21 may be similar or identical to host computer 2030, one of base stations 2012*a*, 2012*b*, 2012*c* and one of UEs 2091, 2092 of FIG. 20, respectively. This is to say, the inner workings of these entities may be as shown in FIG. 21 and independently, the surrounding network topology may be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure may determine the routing, which it may be configured to hide from UE 2130 or from the service provider operating host computer 2110, or both. While OTT connection 2150 is active, the network infrastructure may further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment.

A measurement procedure may be provided for the purpose of monitoring data rate, latency and other factors on which the one or more embodiments improve. There may further be an optional network functionality for reconfiguring OTT connection 2150 between host computer 2110 and UE 2130, in response to variations in the measurement results. The measurement procedure and/or the network functionality for reconfiguring OTT connection 2150 may be implemented in software 2111 and hardware 2115 of host computer 2110 or in software 2131 and hardware 2135 of UE 2130, or both. In embodiments, sensors (not shown) may be deployed in or in association with communication devices through which OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of OTT connection 2150 may include message format, retransmission settings, preferred routing etc.; the reconfiguring need not affect base station 2120, and it may be unknown or imperceptible to base station 2120. Such procedures and functionalities may be known and practiced in the art. In certain embodiments, measurements may involve proprietary UE signaling facilitating host computer 2110's measurements of throughput, propagation times, latency and the like. The measurements may be implemented in that software 2111 and 2131 causes messages to be transmitted, in particular empty or 'dummy' messages, using OTT connection 2150 while it monitors propagation times, errors etc.

Figure 22:
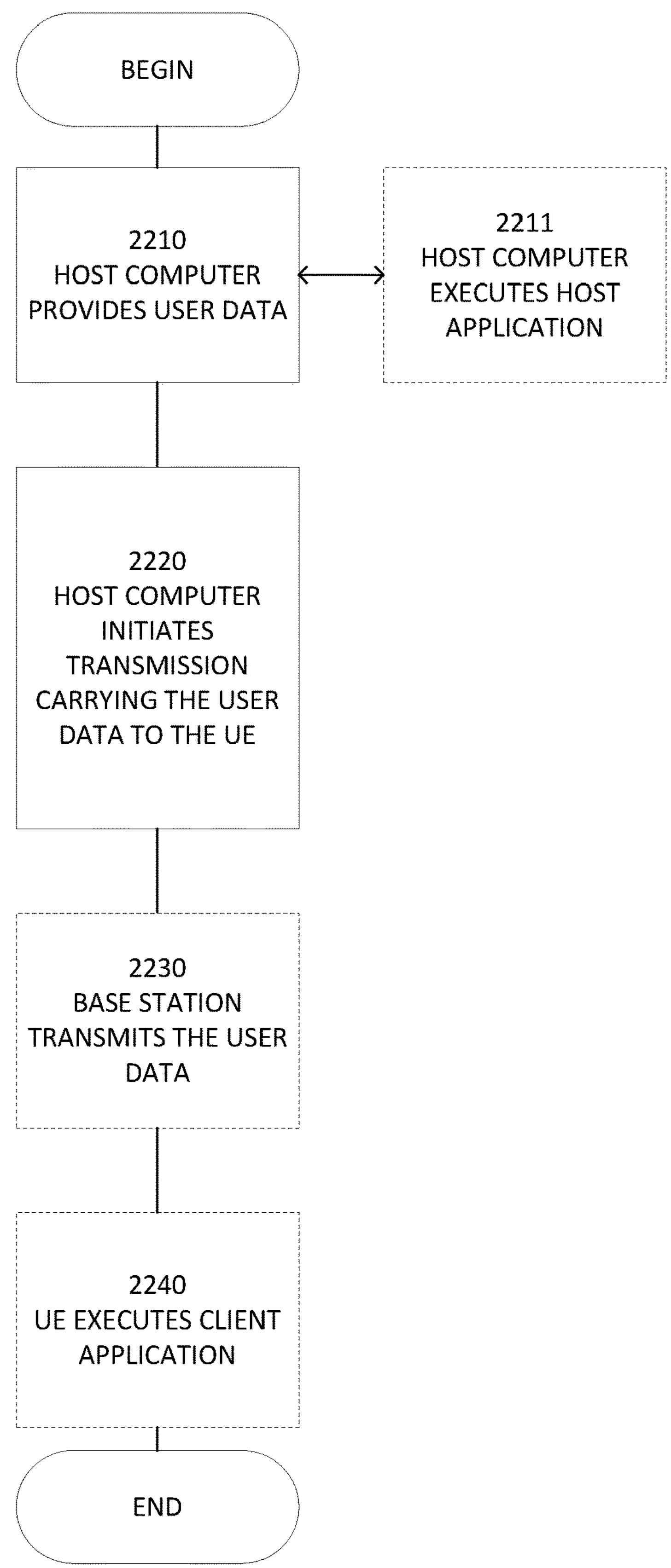
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 2210, the host computer provides user data. In substep 2211 (which may be optional) of step 2210, the host computer provides the user data by executing a host application. In step 2220, the host computer initiates a transmission carrying the user data to the UE. In step 2230 (which may be optional), the base station transmits to the UE the user data which was carried in the transmission that the host computer initiated, in accordance with the teachings of the embodiments described throughout this disclosure. In step 2240 (which may also be optional), the UE executes a client application associated with the host application executed by the host computer.

Figure 23:
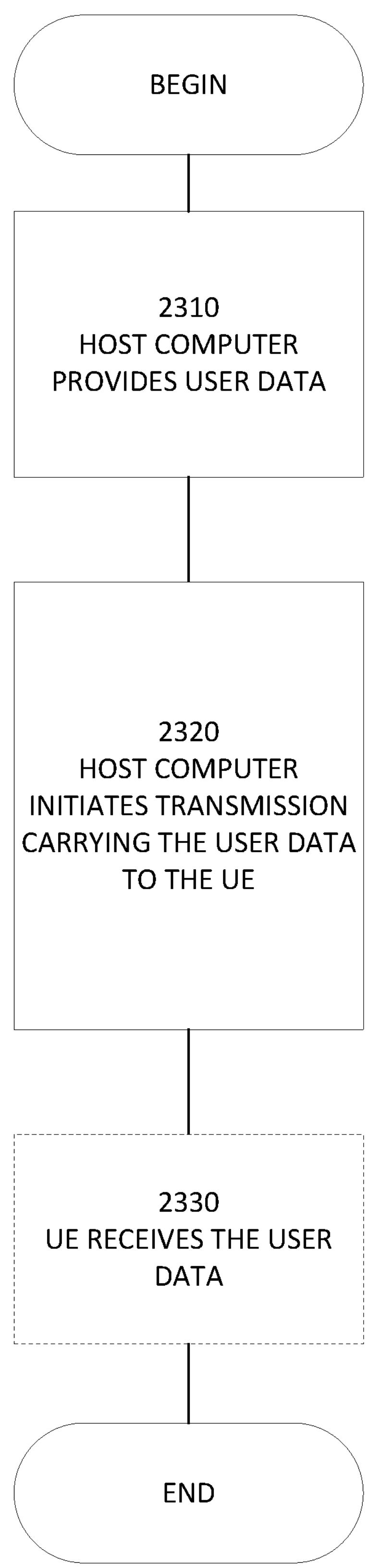
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission may pass via the base station, in accordance with the teachings of the embodiments described throughout this disclosure. In step 2330 (which may be optional), the UE receives the user data carried in the transmission.

Figure 24:
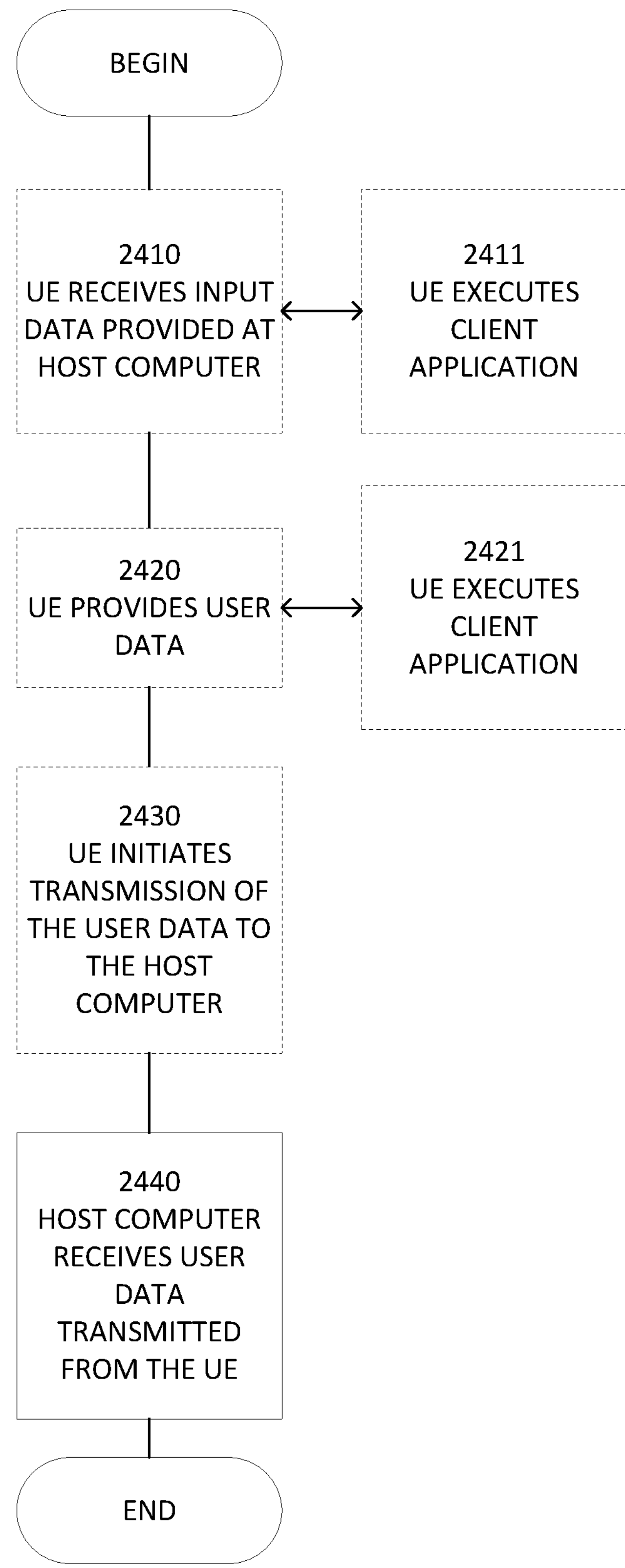
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step 2410 (which may be optional), the UE receives input data provided by the host computer. Additionally or alternatively, in step 2420, the UE provides user data. In substep 2421 (which may be optional) of step 2420, the UE provides the user data by executing a client application. In substep 2411 (which may be optional) of step 2410, the UE executes a client application which provides the user data in reaction to the received input data provided by the host computer. In providing the user data, the executed client application may further consider user input received from the user. Regardless of the specific manner in which the user data was provided, the UE initiates, in substep 2430 (which may be optional), transmission of the user data to the host computer. In step 2440 of the method, the host computer receives the user data transmitted from the UE, in accordance with the teachings of the embodiments described throughout this disclosure.

Figure 25:
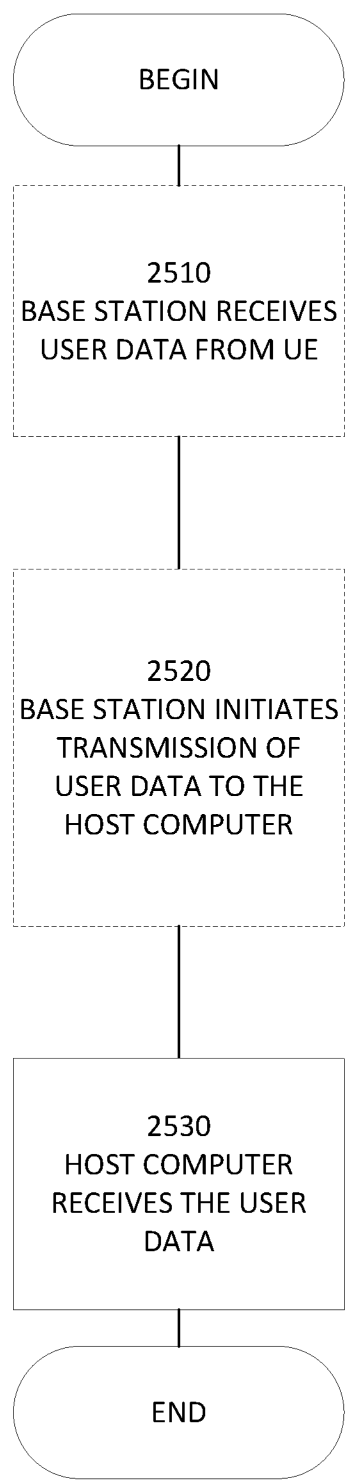
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step 2510 (which may be optional), in accordance with the teachings of the embodiments described throughout this disclosure, the base station receives user data from the UE. In step 2520 (which may be optional), the base station initiates transmission of the received user data to the host computer. In step 2530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Example embodiments of the techniques and apparatus described herein include, but are not limited to, the following enumerated examples:

Group A Embodiments

A1. A method performed by a wireless device configured to operate in first and second access networks, wherein the first and second access networks respectively provide access to first and second core networks of different types, wherein a first wireless communication network comprises the first access network and the first core network, and a second wireless communication network comprises the second access network and the second core network, the method comprising:
- suspending a connection with the first access network;
- while the connection with the first access network is suspended, camping in an area of the second wireless communication network that is included in a notification area within which the wireless device is allowed to move without notifying either of the first and second wireless communication networks, wherein the notification area includes one or more areas of the first wireless communication network and one or more areas of the second wireless communication network; and
- while camping in the area of the second wireless communication network, monitoring a paging channel of the second access network for a paging message directed to the wireless device, using a paging identifier assigned to the wireless device by the first core network.

A2. The method of embodiment A1, wherein the area of the second wireless communication network is a cell of the second access network.

A3. The method of any of embodiments A1-A2, wherein the one or more areas of the first wireless communication network include or cover one or more cells of the first access network and/or wherein the one or more areas of the second wireless communication network include or cover one or more cells of the second access network.

A4. The method of any of embodiments A1-A3, wherein the one or more areas of the first wireless communication network include or cover one or more radio access network, RAN, areas of the first access network, wherein each RAN area of the first access network is or is a subset of a tracking area of the first core network, and/or wherein the one or more areas of the second wireless communication network include or cover one or more RAN areas of the second access network, wherein each RAN area of the second access network is or is a subset of a tracking area of the second core network.

A5. A method performed by a wireless device configured to operate in first and second access networks, wherein the first and second access networks respectively provide access to first and second core networks of different types, wherein a first wireless communication network comprises the first access network and the first core network, and a second wireless communication network comprises the second access network and the second core network, the method comprising:
- suspending a connection with the first access network; and
- while the connection with the first access network is suspended, monitoring a paging channel of the second access network for a paging message directed to the wireless device, using a paging identifier assigned to the wireless device by the first core network.

A6. The method of any of embodiments A1-A5, further comprising:
- receiving a paging message on the monitored paging channel using the paging identifier assigned to the wireless device by the first core network; and
- responsive to receiving the paging message, transmitting to the second access network signaling indicating that the wireless device is in an area of the second wireless communication network or that the wireless device requests a connection to the second access network.

A7. The method of any of embodiments A1-A6, wherein said monitoring comprises monitoring the paging channel also using a paging identifier assigned to the wireless device by the first access network.

A8. A method performed by a wireless device configured to operate in first and second access networks, wherein the first and second access networks respectively provide access to first and second core networks of different types, wherein a first wireless communication network comprises the first access network and the first core network, and a second wireless communication network comprises the second access network and the second core network, the method comprising:
- suspending a connection with the first access network and entering an inactive state;
- while the connection with the first access network is suspended and the wireless device is in the inactive state, camping in an area of the second wireless communication network that is included in a notification area within which the wireless device is allowed to move without notifying either of the first and second wireless communication networks, wherein the notification area includes one or more areas of the first wireless communication network and one or more areas of the second wireless communication network;
- upon camping in the area of the second wireless communication network, starting a timer; and
- responsive to expiry of the timer, switching from the inactive state to an idle state and/or transmitting to the second access network signaling indicating that the wireless device is in the area of the second wireless communication network or that the wireless device requests a connection to the second access network.

A9. A method performed by a wireless device configured to operate in first and second access networks, wherein the first and second access networks respectively provide access to first and second core networks of different types, wherein a first wireless communication network comprises the first access network and the first core network, and a second wireless communication network comprises the second access network and the second core network, the method comprising:
- receiving control signaling indicating a value of a timer that:
  - the wireless device is to start upon the wireless device, while having a connection suspended with the first access network, camping in an area of the second wireless communication network that is included in a notification area; and the wireless device is to, upon expiry of the timer, switch from an inactive state to an idle state and/or transmit to the second access network signaling indicating that the wireless device is in the area of the second wireless communication network or that the wireless device requests a connection to the second access network;

wherein the notification area is an area within which the wireless device is allowed to move without notifying either of the first and second wireless communication networks; and wherein the notification area includes one or more areas of the first wireless communication network and one or more areas of the second wireless communication network.

A10. The method of embodiment A9, further comprising:

suspending a connection with the first access network and entering the inactive state;

while the connection with the first access network is suspended and the wireless device is in the inactive state, camping in an area of the second wireless communication network that is included in the notification area; and starting the timer with the indicated value upon the wireless device camping in the area of the second wireless communication network.

A11. The method of any of embodiments A9-A10, further comprising, responsive to expiry of the timer, switching from the inactive state to the idle state and/or transmitting said signaling to the second access network.

A12. The method of any of embodiments A9-A11, wherein the area of the second wireless communication network is a cell of the second access network.

A13. The method of any of embodiments A9-A12, wherein the one or more areas of the first wireless communication network include or cover one or more cells of the first access network and/or wherein the one or more areas of the second wireless communication network include or cover one or more cells of the second access network.

A14. The method of any of embodiments A9-A13, wherein the one or more areas of the first wireless communication network include or cover one or more radio access network, RAN, areas of the first access network, wherein each RAN area of the first access network is or is a subset of a tracking area of the first core network, and/or wherein the one or more areas of the second wireless communication network include or cover one or more RAN areas of the second access network, wherein each RAN area of the second access network is or is a subset of a tracking area of the second core network.

A15. The method of any of embodiments A1-A14, wherein the connection is a radio resource control, RRC, connection.

A16. The method of any of embodiments A1-A15, wherein the first core network is a 5G Core, 5GC, core network and the second core network is an Evolved Packet Core, EPC, core network.

A17. The method of any of embodiments A1-A16, wherein the first access network is a New Radio, NR, access network, and wherein the second access network is a Long Term Evolution, LTE, access network or an Evolved UMTS Terrestrial Radio Access Network, E-UTRAN.

A18. The method of any of embodiments A1-A17, the first access network and the second access network are each a Long Term Evolution, LTE, access network or an Evolved UMTS Terrestrial Radio Access Network, E-UTRAN.

A19. The method of any of embodiments A1-A7 and A15-A18, wherein the paging identifier is a 5G-S-TMSI identifier.

AA. The method of any of the previous embodiments, further comprising:

providing user data; and forwarding the user data to a host computer via the transmission to the base station.

Group B Embodiments

B1. A method performed by a second radio network node configured for use in a second access network that provides access to a second core network, the method comprising:

transmitting, on a paging channel of the second access network, a paging message directed to a wireless device, using a paging identifier assigned to the wireless device by a first core network that is of a different type than the second core network.

B2. The method of embodiment B1, further comprising:

receiving control signalling that indicates the paging identifier.

B3. A method performed by a second network node configured for use in a second wireless communication network that comprises a second access network and a second core network, the method comprising:

receiving control signalling that indicates a paging identifier assigned to a wireless device by a first core network of a different type than the second core network.

B4. The method of embodiment B3, further comprising paging the wireless device using the paging identifier.

B5. The method of embodiment B3, further comprising:

deriving, from the indicated paging identifier, a paging identifier assigned to the wireless device by the second core network or the second access network; and paging the wireless device using the derived paging identifier.

B6. The method of any of embodiments B3-B5, wherein the control signalling further indicates one or more areas of the second wireless communication network in which the wireless device is to be paged.

B7. The method of any of embodiments B2-B6, wherein the control signalling is received from a first radio network node in a first access network that provides access to the first core network.

B8. The method of any of embodiments B2-B7, wherein the control signalling comprises X2AP signalling.

B9. The method of any of embodiments B2-B8, wherein the control signalling is or is included in a RAN paging message.

B10. The method of any of embodiments B2-B6, wherein the control signalling is received from a first core network node in the first core network.

B11. The method of embodiment B10, wherein the first core network node implements an access and mobility function, AMF.

B12. The method of any of embodiments B10-B11, wherein the second network node is a radio network node that is configured to connect with the first core network node in the first core network but is not connected to a user plane function, UPF, in the first core network.

B13. The method of any of embodiments B10-B11, wherein the second network node is a core network node in the second core network.

B14. The method of embodiment B13, wherein the second network node implements a mobility management entity, MME.

B15. A method performed by a first network node configured for use in a first wireless communication network that comprises a first access network and a first core network, the method comprising:

transmitting, to a second network node configured for use in a second wireless communication network that comprises a second access network and a second core network of a different type than the first core network, control signalling that indicates a paging identifier assigned to a wireless device by the first core network.

B16. The method of embodiment B15, wherein the control signalling further indicates one or more areas of the second wireless communication network in which the wireless device is to be paged.

B17. The method of any of embodiments B15-B16, wherein the first network node is a first radio network node in the first access network.

B18. The method of any of embodiments B15-B17, wherein the control signalling comprises X2AP signalling.

B19. The method of any of embodiments B15-B18, wherein the control signalling is or is included in a RAN paging message or a paging request.

B20. The method of any of embodiments B15-B16, wherein the first network node is a first core network node in the first core network.

B21. The method of embodiment B20, wherein the first core network node implements an access and mobility function, AMF.

B22. The method of any of embodiments B20-B21, wherein the second network node is a radio network node that is configured to connect with the first core network node in the first core network but is not connected to a user plane function, UPF, in the first core network.

B23. The method of any of embodiments B20-B21, wherein the second network node is a core network node in the second core network.

B24. The method of embodiment B23, wherein the second network node implements a mobility management entity, MME.

B25. A method performed by a first radio network node configured for use in a first access network that provides access to a first core network, wherein a first wireless communication network comprises the first access network and the first core network, the method comprising:

transmitting, to a first core network node in the first core network, control signalling that indicates one or more areas that are included in a notification area within which a wireless device is allowed to move without notifying either of the first and second wireless communication networks, wherein the notification area includes one or more areas of the first wireless communication network and/or one or more areas of the second wireless communication network.

B26. The method of embodiment B25, wherein the control signaling is N2 signaling.

B27. The method of any of embodiments B25-B26, wherein the first core network node implements an access and control function, AMF.

B28. A method performed by a first radio network node configured for use in a first access network that provides access to a first core network, wherein a first wireless communication network comprises the first access network and the first core network, the method comprising:

receiving, from a first core network node in the first core network, control signalling indicating one or more areas in which a wireless device is to be paged and/or in a notification area within which the wireless device is allowed to move without notifying either of the first and second wireless communication networks, wherein the notification area includes one or more areas of the first wireless communication network and/or one or more areas of the second wireless communication network.

B29. The method of embodiment B28, further comprising paging the wireless device in at least some of the one or more areas indicated and/or sending a paging request to one or more network nodes controlling at least some of the one or more areas indicated.

B30. The method of any of embodiments B28-B29, wherein the wireless device is a wireless device for which the first radio network node has lost a context that indicates the notification area.

B31. A method performed by a first radio network node configured for use in a first access network that provides access to a first core network, wherein a first wireless communication network comprises the first access network and the first core network, the method comprising:

receiving, from a first core network node in the first core network, a request to page a wireless device for which the first radio network node lacks or has lost a context (that indicates a notification area within which the wireless device is allowed to move without notifying either of the first wireless communication network and a second wireless communication network, wherein the notification area includes one or more areas of the first wireless communication network and/or one or more areas of the second wireless communication network, wherein the first and second wireless communication networks have core networks of different types); and responsive to receiving the request, paging the wireless device in all areas or radio network nodes with which the first radio network node has a neighbor relation.

B32. The method of embodiment B31, wherein the received request further indicates whether the wireless device is in an inactive state, and wherein said paging is performed selectively for wireless devices in the inactive state.

B33. The method of any of embodiments B1-B32, wherein the first core network is a 5G Core, 5GC, core network and the second core network is an Evolved Packet Core, EPC, core network.

B34. The method of any of embodiments B1-B33, wherein a first access network provides access to the first core network, wherein the first access network is a New Radio, NR, access network, and wherein the second access network is a Long Term Evolution, LTE, access network or an Evolved UMTS Terrestrial Radio Access Network, E-UTRAN.

B35. The method of any of embodiments B1-B34, wherein a first access network provides access to the first core network, the first access network and the second access network are each a Long Term Evolution, LTE, access network or an Evolved UMTS Terrestrial Radio Access Network, E-UTRAN.

B36. The method of any of embodiments B1-B35, wherein the paging identifier is a 5G-S-TMSI identifier.

B37. The method of any of embodiments B1-B36, wherein the wireless device is a wireless device for which the first access network has lost a context (that indicates a notification area within which the wireless device is allowed to move without notifying either of the first wireless communication network and a second wireless communication network).

B38. A method performed by a network node configured to operate in a first wireless communication network or a second wireless communication network, wherein the first wireless communication network comprises a first access network and a first core network, and the second wireless communication network comprises a second access network and a second core network, the method comprising:

transmitting, to a wireless device, control signaling indicating a value of a timer that:

the wireless device is to start upon the wireless device, while having a connection suspended with the first access network, camping in an area of the second wireless communication network that is included in a notification area; and the wireless device is to, upon expiry of the timer, switch from an inactive state to an idle state and/or transmit to the second access network signaling indicating that the wireless device is in the area of the second wireless communication network or that the wireless device requests a connection to the second access network;

wherein the notification area is an area within which the wireless device is allowed to move without notifying either of the first and second wireless communication networks; and wherein the notification area includes one or more areas of the first wireless communication network and one or more areas of the second wireless communication network.

BB. The method of any of the previous embodiments, further comprising:

obtaining user data; and forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:

communication circuitry; and processing circuitry configured to perform any of the steps of any of the Group A embodiments.

C4. A wireless device comprising:

processing circuitry configured to perform any of the steps of any of the Group A embodiments; and power supply circuitry configured to supply power to the wireless device.

C5. A wireless device comprising:

processing circuitry and memory, the memory containing instructions executable by the processing circuitry whereby the wireless device is configured to perform any of the steps of any of the Group A embodiments.

C6. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A network node configured to perform any of the steps of any of the Group B embodiments.

C10. A network node comprising processing circuitry configured to perform any of the steps of any of the Group B embodiments.

C11. A network node comprising:

communication circuitry; and processing circuitry configured to perform any of the steps of any of the Group B embodiments.

C12. A network node comprising:

processing circuitry configured to perform any of the steps of any of the Group B embodiments;

power supply circuitry configured to supply power to the network node.

C13. A network node comprising:

processing circuitry and memory, the memory containing instructions executable by the processing circuitry whereby the network node is configured to perform any of the steps of any of the Group B embodiments.

C14. The network node of any of embodiments C9-C13, wherein the network node is a base station.

C15. A computer program comprising instructions which, when executed by at least one processor of a network node, causes the network node to carry out the steps of any of the Group B embodiments.

C16. The computer program of embodiment C14, wherein the network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:

the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:

at the UE, executing a client application, thereby providing the user data to be transmitted; and at the host computer, executing a host application associated with the client application.

D22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| Abbreviation | Meaning |
|---|---|
| 1x RTT | CDMA2000 1x Radio Transmission Technology |
| 3GPP | 3rd Generation Partnership Project |
| 5G | 5th Generation |
| ABS | Almost Blank Subframe |
| ARQ | Automatic Repeat Request |
| AWGN | Additive White Gaussian Noise |
| BCCH | Broadcast Control Channel |
| BCH | Broadcast Channel |
| CA | Carrier Aggregation |
| CC | Carrier Component |
| CCCH SDU | Common Control Channel SDU |
| CDMA | Code Division Multiplexing Access |
| CGI | Cell Global Identifier |
| CIR | Channel Impulse Response |
| CP | Cyclic Prefix |
| CPICH | Common Pilot Channel |
| CPICH Ec/No | CPICH Received energy per chip divided by the power density in the band |
| CQI | Channel Quality information |
| C-RNTI | Cell RNTI |
| CSI | Channel State Information |
| DCCH | Dedicated Control Channel |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| FFS | For Further Study |
| GERAN | GSM EDGE Radio Access Network |
| gNB | Base station in NR |
| GNSS | Global Navigation Satellite System |
| GSM | Global System for Mobile communication |
| HARQ | Hybrid Automatic Repeat Request |
| HO | Handover |
| HSPA | High Speed Packet Access |
| HRPD | High Rate Packet Data |
| LOS | Line of Sight |
| LPP | LTE Positioning Protocol |
| LTE | Long-Term Evolution |
| MAC | Medium Access Control |

-continued

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| Abbreviation | Meaning |
|---|---|
| MBMS | Multimedia Broadcast Multicast Services |
| MBSFN | Multimedia Broadcast multicast service Single Frequency Network |
| MBSFN ABS | MBSFN Almost Blank Subframe |
| MDT | Minimization of Drive Tests |
| MIB | Master Information Block |
| MME | Mobility Management Entity |
| MSC | Mobile Switching Center |
| NPDCCH | Narrowband Physical Downlink Control Channel |
| NR | New Radio |
| OCNG | OFDMA Channel Noise Generator |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDP | Profile Delay Profile |
| PDSCH | Physical Downlink Shared Channel |
| PGW | Packet Gateway |
| PHICH | Physical Hybrid-ARQ Indicator Channel |
| PLMN | Public Land Mobile Network |
| PMI | Precoder Matrix Indicator |
| PRACH | Physical Random Access Channel |
| PRS | Positioning Reference Signal |
| PSS | Primary Synchronization Signal |
| PUCCH | Physical Uplink Control Channel |
| PUSCH | Physical Uplink Shared Channel |
| RACH | Random Access Channel |
| QAM | Quadrature Amplitude Modulation |
| RAN | Radio Access Network |
| RAT | Radio Access Technology |
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SNR | Signal to Noise Ratio |
| SON | Self Optimized Network |
| SS | Synchronization Signal |
| SSS | Secondary Synchronization Signal |
| TDD | Time Division Duplex |
| TDOA | Time Difference of Arrival |
| TOA | Time of Arrival |
| TSS | Tertiary Synchronization Signal |
| TTI | Transmission Time Interval |
| UE | User Equipment |
| UL | Uplink |
| UMTS | Universal Mobile Telecommunication System |
| USIM | Universal Subscriber Identity Module |
| UTDOA | Uplink Time Difference of Arrival |
| UTRA | Universal Terrestrial Radio Access |
| UTRAN | Universal Terrestrial Radio Access Network |

-continued

| ABBREVIATIONS<br>At least some of the following abbreviations may be used in this disclosure. If there is an inconsistency between abbreviations, preference should be given to how it is used above. If listed multiple times below, the first listing should be preferred over any subsequent listing(s). | |
|---|---|
| WCDMA | Wide CDMA |
| WLAN | Wide Local Area Network |

What is claimed is:

1. A method performed by a wireless device configured to operate in first and second access networks, the first and second access networks respectively providing access to first and second core networks of different types, a first wireless communication network comprising the first access network and the first core network, and a second wireless communication network comprising the second access network and the second core network, the method comprising:
   - suspending a connection with the first access network and entering an inactive state;
   - while the connection with the first access network is suspended and the wireless device is in the inactive state, camping in a specific area of the second wireless communication network that is included in a notification area within which the wireless device is allowed to move without notifying either of the first and second wireless communication networks, the notification area including first one or more areas of the first wireless communication network and second one or more areas of the second wireless communication network;
   - upon camping in the specific area of the second wireless communication network, starting a timer; and
   - responsive to expiry of the timer, at least one of switching from the inactive state to an idle state and transmitting to the second access network signaling indicating one of that the wireless device is in the specific area of the second wireless communication network and that the wireless device requests a connection to the second access network.

2. The method of claim 1, wherein the specific area of the second wireless communication network is a cell of the second access network, and wherein at least one of:
   - the first one or more areas of the first wireless communication network one of include and cover one or more cells of the first access network; and
   - the second one or more areas of the second wireless communication network one of include and cover one or more cells of the second access network.

3. The method of claim 1, wherein the connection with the first access network is a radio resource control (RRC) connection, wherein the inactive state is an RRC inactive state, and wherein the idle state is an RRC idle state.

4. The method of claim 1, wherein the first core network is a 5G Core (5GC) core network and the second core network is an Evolved Packet Core, EPC, core network.

5. The method of claim 1, wherein one of:
   - the first access network is a New Radio (NR) access network, and the second access network is one of a Long Term Evolution (LTE) access network and an Evolved UMTS Terrestrial Radio Access Network (E-UTRAN); and
   - the first access network and the second access network are each one of a LTE access network and an E-UTRAN.

6. The method of claim 1, wherein the notification area is a radio access network notification area (RNA) and wherein the timer is an RNA update timer.

7. The method of claim 1, further comprising, upon camping in the specific area of the second wireless communication network, determining whether or not the specific area of the second wireless communication network is included in the notification area, and deciding whether or not to start the timer depending respectively on whether or not the specific area of the second wireless communication network is included in the notification area according to the determining, wherein the starting the timer is performed responsive to deciding to start the timer.

8. The method of claim 1, wherein the timer is to be stopped one of responsive to the wireless device camping in an area of the first wireless communication network and responsive to the wireless device entering the idle state.

9. The method of claim 1, further comprising receiving control signaling indicating a value of the timer, and wherein said starting comprises starting the timer with the indicated value.

10. The method of claim 9, wherein the control signaling is included in an RRC Release message.

11. The method of claim 1, wherein the timer is started with a value corresponding to 1 minute or less in time.

12. The method of claim 1, further comprising, while camping in the specific area of the second wireless communication network, monitoring a paging channel of the second access network for a paging message directed to the wireless device, using a paging identifier assigned to the wireless device by the first core network.

13. The method of claim 12, wherein the paging identifier is a 5G-S-TMSI identifier.

14. A wireless device configured to operate in first and second access networks, the first and second access networks respectively providing access to first and second core networks of different types, a first wireless communication network comprising the first access network and the first core network, and a second wireless communication network comprising the second access network and the second core network, the wireless device comprising:
   - communication circuitry; and
   - processing circuitry configured to:
     - suspend a connection with the first access network and entering an inactive state;
     - while the connection with the first access network is suspended and the wireless device is in the inactive state, camp in a specific area of the second wireless communication network that is included in a notification area within which the wireless device is allowed to move without notifying either of the first and second wireless communication networks, the notification area including first one or more areas of the first wireless communication network and second one or more areas of the second wireless communication network;
     - upon camping in the specific area of the second wireless communication network, start a timer; and
     - responsive to expiry of the timer, at least one of switch from the inactive state to an idle state and transmit to the second access network signaling indicating one of that the wireless device is in the specific area of the second wireless communication network and that the wireless device requests a connection to the second access network.

15. A method performed by a wireless communication system that comprises a first wireless communication network and a second wireless communication network, the first wireless communication network comprising a first access network and a first core network, and the second wireless communication network comprising a second access network and a second core network, the method comprising:

transmitting, from one of a network node in the first wireless communication network and the second wireless communication network, control signaling to a wireless device, the control signaling indicating a value of a timer;

starting, by the wireless device, the timer with the indicated value upon the wireless device, while having a connection suspended with the first access network, camping in a specific area of the second wireless communication network that is included in a notification area, wherein the notification area is an area within which the wireless device is allowed to move without notifying either of the first and second wireless communication networks, the notification area including first one or more areas of the first wireless communication network and second one or more areas of the second wireless communication network; and upon expiry of the timer, at least one of switching, by the wireless device, from an inactive state to an idle state and transmitting from the wireless device to the second access network signaling indicating one of that the wireless device is in the specific area of the second wireless communication network and that the wireless device requests a connection to the second access network.

16. The method of claim 15, wherein the specific area of the second wireless communication network is a cell of the second access network, and wherein at least one of:

the first one or more areas of the first wireless communication network one of include and cover one or more cells of the first access network; and the second one or more areas of the second wireless communication network include or cover one or more cells of the second access network.

17. The method of claim 15, wherein the connection suspended with the first access network is a radio resource control (RRC) connection, wherein the inactive state is an RRC inactive state, and wherein the idle state is an RRC idle state.

18. The method of claim 15, wherein the first core network is a 5G Core (5GC) core network and the second core network is an Evolved Packet Core, EPC, core network.

19. The method of claim 15, wherein one of:

the first access network is a New Radio (NR) access network, and the second access network is one of a Long Term Evolution (LTE) access network and an Evolved UMTS Terrestrial Radio Access Network (E-UTRAN); and the first access network and the second access network are each one of a LTE access network and an E-UTRAN.

20. The method of claim 15, wherein the notification area is a radio access network notification area (RNA) and wherein the timer is an RNA update timer.

21. The method of claim 15, wherein the timer is to be stopped responsive to the wireless device camping in an area of the first wireless communication network or responsive to the wireless device entering the idle state.

22. The method of claim 15, wherein the control signaling is included in an RRC Release message.

23. The method of claim 15, wherein the value indicated by the control signaling corresponds to 1 minute or less in time.

24. The method of claim 15, wherein the network node is configured to operate in the first wireless communication network.

25. A wireless communication system comprising:

a first wireless communication network comprising a first access network and a first core network;

a second wireless communication network comprising a second access network and a second core network;

a network node configured to operate in one of the first wireless communication network and the second wireless communication network, the network node configured to transmit, from the network node to a wireless device, control signaling that indicates a value of a timer; and the wireless device, the wireless device being configured to:

start the timer with the indicated value upon the wireless device, while having a connection suspended with the first access network, camping in a specific area of the second wireless communication network that is included in a notification area, the notification area being an area within which the wireless device is allowed to move without notifying either of the first and second wireless communication networks, the notification area including first one or more areas of the first wireless communication network and second one or more areas of the second wireless communication network; and upon expiry of the timer, at least one of switch from an inactive state to an idle state and transmit from the wireless device to the second access network signaling indicating that the wireless device is in the specific area of the second wireless communication network or that the wireless device requests a connection to the second access network.

* * * * *